US012489220B2

(12) United States Patent
Wei et al.

(10) Patent No.: US 12,489,220 B2
(45) **Date of Patent: *Dec. 2, 2025**

(54) TERMINAL ANTENNA

(71) Applicant: Honor Device Co., Ltd., Shenzhen (CN)

(72) Inventors: Kunpeng Wei, Shenzhen (CN); Qiao Guan, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/272,281

(22) PCT Filed: Dec. 8, 2022

(86) PCT No.: PCT/CN2022/137638

§ 371 (c)(1),
(2) Date: Jul. 13, 2023

(87) PCT Pub. No.: WO2023/173835

PCT Pub. Date: Sep. 21, 2023

(65) Prior Publication Data

US 2024/0388008 A1 Nov. 21, 2024

(30) Foreign Application Priority Data

Mar. 18, 2022 (CN) ........................ 202210271441.X

(51) Int. Cl.
*H01Q 21/06* (2006.01)
*H01Q 1/38* (2006.01)
*H01Q 15/24* (2006.01)

(52) U.S. Cl.
CPC ............ *H01Q 21/062* (2013.01); *H01Q 1/38* (2013.01); *H01Q 15/24* (2013.01)

(58) Field of Classification Search
CPC ........ H01Q 21/062; H01Q 1/38; H01Q 15/24; H01Q 7/00; H01Q 21/28; H01Q 1/2291; H01Q 1/241; H01Q 1/50
See application file for complete search history.

(56) References Cited

U.S. PATENT DOCUMENTS 7,365,698 B2 4/2008 Dwyer et al.
8,125,391 B2 2/2012 Knudsen (Continued)

FOREIGN PATENT DOCUMENTS

CN 101257143 A 9/2008
CN 101794934 A 8/2010

(Continued)

OTHER PUBLICATIONS

Tian et al: "Design of dual-frequency and dual-polarization CTS array antenna based on parallel plate waveguide", Journal of Telemetry, Tracking and Command, vol. 44, No. 2, Mar. 2023, pp. 112-122.

(Continued)

*Primary Examiner* — Seung H Lee
(74) *Attorney, Agent, or Firm* — Slater Matsil, LLP

(57) ABSTRACT

Embodiments of this application disclose a terminal antenna, and relate to the field of antenna technologies. The terminal antenna includes a first radiator and a second radiator, the first radiator is in a ring structure, the second radiator is disposed inside the first radiator, the first radiator and the second radiator are not directly connected, and the first radiator and the second radiator are located on a same plane. The terminal antenna further includes at least two inductor components, one end of the inductor component is connected to the first radiator, and the other end of the inductor component is connected to the second radiator. A feed is further disposed on the terminal antenna, one end of (Continued)

the feed is disposed on the first radiator, and the other end of the feed is disposed on the second radiator.

20 Claims, 23 Drawing Sheets

(56) References Cited

U.S. PATENT DOCUMENTS

| | | | |
|---|---|---|---|
| 8,547,283 | B2 | 10/2013 | Wong et al. |
| 9,325,070 | B1 | 4/2016 | Obeidat et al. |
| 9,484,631 | B1 | 11/2016 | Napoles et al. |
| 9,722,325 | B2 | 8/2017 | Svendsen et al. |
| 9,825,366 | B2 | 11/2017 | Li et al. |
| 10,224,605 | B2 | 3/2019 | Wang et al. |
| 11,283,154 | B2 | 3/2022 | Wen et al. |
| 11,862,877 | B2 | 1/2024 | Kosaka et al. |
| 12,212,047 | B2 * | 1/2025 | Samardzija .............. H01Q 9/26 |
| 2004/0212545 | A1 | 10/2004 | Li et al. |
| 2005/0088342 | A1 | 4/2005 | Parsche |
| 2007/0040758 | A1 | 2/2007 | Dwyer et al. |
| 2007/0205947 | A1 | 9/2007 | Boyle |
| 2012/0001815 | A1 | 1/2012 | Wong et al. |
| 2012/0068901 | A1 | 3/2012 | Ryou et al. |
| 2012/0223867 | A1 | 9/2012 | Morton et al. |
| 2012/0274522 | A1 | 11/2012 | Ayatollahi |
| 2014/0028512 | A1 | 1/2014 | Lindenmeier et al. |
| 2016/0294048 | A1 | 10/2016 | Xu et al. |
| 2018/0287250 | A1 * | 10/2018 | Caren .................. H01Q 1/3275 |
| 2018/0358703 | A1 | 12/2018 | Ban |
| 2018/0358707 | A1 | 12/2018 | Jamaly |
| 2021/0328338 | A1 | 10/2021 | Da Costa Bras Lima et al. |
| 2023/0178894 | A1 | 6/2023 | Shen et al. |
| 2023/0223677 | A1 | 7/2023 | Wu et al. |
| 2023/0352854 | A1 | 11/2023 | Wu |
| 2025/0087889 | A1 | 3/2025 | Hu et al. |

FOREIGN PATENT DOCUMENTS

| | | | |
|---|---|---|---|
| CN | 102170044 | A | 8/2011 |
| CN | 102694236 | A | 9/2012 |
| CN | 202678524 | U | 1/2013 |
| CN | 203521598 | U | 4/2014 |
| CN | 103915682 | A | 7/2014 |
| CN | 104218320 | A | 12/2014 |
| CN | 104396086 | A | 3/2015 |
| CN | 204793198 | U | 11/2015 |
| CN | 105206911 | A | 12/2015 |
| CN | 106025514 | A | 10/2016 |
| CN | 103811857 | B | 1/2017 |
| CN | 106910991 | A | 6/2017 |
| CN | 106953171 | A | 7/2017 |
| CN | 107925156 | A | 4/2018 |
| CN | 107978861 | A | 5/2018 |
| CN | 208226094 | U | 12/2018 |
| CN | 109244645 | A | 1/2019 |
| CN | 110323541 | A | 10/2019 |
| CN | 106463827 | B | 11/2019 |
| CN | 210182566 | U | 3/2020 |
| CN | 111342226 | A | 6/2020 |
| CN | 111463571 | A | 7/2020 |
| CN | 111628274 | A | 9/2020 |
| CN | 111628298 | A | 9/2020 |
| CN | 111725618 | A | 9/2020 |
| CN | 111883930 | A | 11/2020 |
| CN | 112448162 | A | 3/2021 |
| CN | 212725577 | U | 3/2021 |
| CN | 112751181 | A | 5/2021 |
| CN | 112993568 | A | 6/2021 |
| CN | 113224504 | A | 8/2021 |
| CN | 113451741 | A | 9/2021 |
| CN | 113471665 | A | 10/2021 |
| CN | 113471678 | A | 10/2021 |
| CN | 214378835 | U | 10/2021 |
| CN | 113708055 | A | 11/2021 |
| CN | 215299500 | U | 12/2021 |
| CN | 114171900 | A | 3/2022 |
| CN | 114865291 | A | 8/2022 |
| CN | 115313037 | A | 11/2022 |
| CN | 113678318 | B | 12/2022 |
| CN | 115663455 | A | 1/2023 |
| EP | 1755192 | A1 | 2/2007 |
| EP | 2405533 | A1 | 1/2012 |
| EP | 3416240 | A1 | 12/2018 |
| KR | 20100098906 | A | 9/2010 |
| WO | 2020137137 | A1 | 7/2020 |

OTHER PUBLICATIONS

X. Qing, Z. Yunjia, Z. N. Chen and J. Shi, "An overview: Zero-phase-shift line (ZPSL) loop antennas for ultra-high frequency (UHF) near-field RFID applications," 2016 IEEE Region 10 Conference (TENCON), Singapore, Nov. 22-25, 2016, pp. 120-122.

Venkata Rajasekhar Nuthakki et al: "Via-less CRLH-TL unit cells loaded compact and bandwidth-enhanced Metamaterial based antennas", International Journal of Electronics and Communications (AEU), Elsevier, Amsterdam, NL, vol. 80, Jun. 27, 2017 (Jun. 27, 2017), pp. 48-58.

* cited by examiner

45° view

Top view

TERMINAL ANTENNA

CROSS-REFERENCE TO RELATED APPLICATIONS

This application is a National Stage of International Application No. PCT/CN2022/137638, filed on Dec. 8, 2022, which claims priority to Chinese Patent Application No. 202210271441.X, filed on Mar. 18, 2022, both of which are hereby incorporated by reference in their entireties.

TECHNICAL FIELD

This application relates to the field of antenna technologies, and in particular, to a terminal antenna.

BACKGROUND

When an electronic device receives and transmits a signal by using an antenna disposed in the electronic device, because different signals may have different polarization directions, the antenna in the electronic device needs to have relatively rich polarization characteristics. For example, when receiving and transmitting a vertically polarized wave, the antenna in the electronic device needs to have a vertical polarization characteristic.

In addition, a setting space that can be provided by the electronic device for the antenna becomes smaller and smaller. Therefore, a structural miniaturization design needs to be implemented while the antenna needs to have the vertical polarization characteristic. For example, when a height space that can be provided by the electronic device is limited, the antenna needs to be able to implement the vertical polarization characteristic in the limited height space.

SUMMARY

Embodiments of this application provide a terminal antenna, and provide a solution of a low-profile vertically polarized antenna, so as to avoid a problem that vertical polarization of an electronic device cannot be implemented due to a limitation of a height space.

To achieve the foregoing objective, the following technical solutions are used in the embodiments of this application:

According to a first aspect, a terminal antenna is provided, where the terminal antenna is disposed in an electronic device, the terminal antenna includes a first radiator and a second radiator, the first radiator is in a ring structure, the second radiator is disposed inside the first radiator, the first radiator and the second radiator are not directly connected, and the first radiator and the second radiator are located on a same plane. The terminal antenna further includes at least two inductor components, one end of the inductor component is connected to the first radiator, and the other end of the inductor component is connected to the second radiator. A feed is further disposed on the terminal antenna, one end of the feed is connected to the first radiator, and the other end of the feed is connected to the second radiator.

Based on this solution, All radiators of the antenna may be disposed on a same plane. Therefore, there is no requirement for a height, that is, a low profile is implemented. In an antenna solution in this solution, an inner radiator (for example, the second radiator) may be used as a reference ground when an outer radiator (for example, the first radiator) works. A plurality of inductor components are disposed between the outer radiator and the inner radiator, so that a region between adjacent inductor components and a region surrounded by the outer radiator and the inner radiator can have uniform electric field distribution. An electric field direction may be a direction from the second radiator to the first radiator, or a direction from the first radiator to the second radiator. That is, the electric field is perpendicular to the reference ground. Therefore, the vertical polarization characteristic is implemented in the foregoing structure of a low profile.

In a possible design, the inductor component is a metal body distributed in a serpentine line. Based on this solution, a specific implementation of an inductor component is provided, for example, a distributed inductor setting is implemented by using a serpentine linear structure. Certainly, in some other designs, the inductor component may also be a lumped inductor device.

In a possible design, the at least two inductor components are rotationally symmetrically distributed in a slot between the first radiator and the second radiator. Based on this solution, a structural setting limitation of an inductor component is provided. Therefore, the antenna can have better symmetry, and has better omni-directivity while providing a vertical polarization characteristic.

In a possible design, a symmetry angle of the rotational symmetry is 360 degrees divided by N, and N is a quantity of inductor components. Based on this solution, a specific limitation of rotational symmetry is provided.

In a possible design, a first inductor component is replaced with the feed, the feed after replacement is disposed at a position of the first inductor component, and the first inductor component is included in the at least two inductor components. Based on this solution, a feed setting solution is provided.

In a possible design, the feed is disposed at a middle position between any two adjacent inductor components. Based on this solution, another feed setting solution is provided.

In a possible design, that the first radiator is in a ring structure includes: the first radiator is in a circular ring structure; the second radiator is in a circular structure; and geometric centers of the first radiator and the second radiator coincide. Based on this solution, a structural feature limitation of the antenna is provided. Therefore, the antenna has better symmetry, so as to provide a better omnidirectional radiation characteristic.

In a possible design, when an operating frequency band of the terminal antenna includes 5150 MHz to 5850 MHz, an equivalent inductance of the first radiator between two adjacent inductor components is included in a range of [1 nH, 4 nH]. An equivalent capacitance between the first radiator and the second radiator between two adjacent inductor components is included in a range of [0.1 pF, 1 pF], and an equivalent inductance of the inductor component is included in a range of [1 nH, 5 nH]. A region between the two adjacent inductor components does not include a feed. Based on this solution, a specific limitation of a value of an equivalent inductance or an equivalent capacitance of each component is provided when the antenna works on a 5G Wi-Fi frequency band. Based on this, when the first radiator, the second radiator, and the serpentine line metal body are separately disposed by using materials with different dielectric constants, size setting may be performed based on the equivalent value.

In a possible design, when an operating frequency band of the terminal antenna includes 5150 MHz to 5850 MHz, an inner circle radius of the first radiator is included in a range of [10 mm, 25 mm], a radius of the second radiator is included in a range of [8 mm, 15 mm], and a maximum width of a contour of a serpentine line metal body is included in a range of [1 mm, 6 mm]. The inner circle radius of the first radiator is greater than the radius of the second radiator. Based on this solution, a specific limitation of a size value of each component when the antenna works on a 5G Wi-Fi frequency band is provided.

In a possible design, when an operating frequency band of the terminal antenna includes 1710 MHz to 2700 MHz, an equivalent inductance of the first radiator between two adjacent inductor components is included in a range of [3 nH, 10 nH]. An equivalent capacitance between the first radiator and the second radiator between two adjacent inductor components is included in a range of [0.3 pF, 2 pF], an equivalent inductance of the inductor component is included in a range of [3 nH, 15 nH], and a feed is not included between the two adjacent inductor components. Based on this solution, a specific limitation of a value of an equivalent inductance or an equivalent capacitance of each component is provided when the antenna works on a medium or high frequency band. Based on this, when the first radiator, the second radiator, and the serpentine line metal body are separately disposed by using materials with different dielectric constants, size setting may be performed based on the equivalent value.

In a possible design, the antenna has a vertical polarization characteristic when working. Based on this solution, a limitation description of a polarization characteristic when the antenna works is provided.

According to a second aspect, an electronic device is provided, and the electronic device is disposed in the terminal antenna provided in any one of the first aspect or the possible designs of the first aspect. When the electronic device transmits or receives a signal, the signal is transmitted or received through the terminal antenna. For example, the electronic device may be a large screen, a router, or the like, so that the device can have a low-profile vertical polarization characteristic.

It should be understood that the technical solutions of the second aspect can be corresponding to the first aspect and any possible design of the first aspect. Therefore, beneficial effects that can be achieved are similar, and details are not described herein again.

DETAILED DESCRIPTION OF ILLUSTRATIVE EMBODIMENTS

Figure 1:
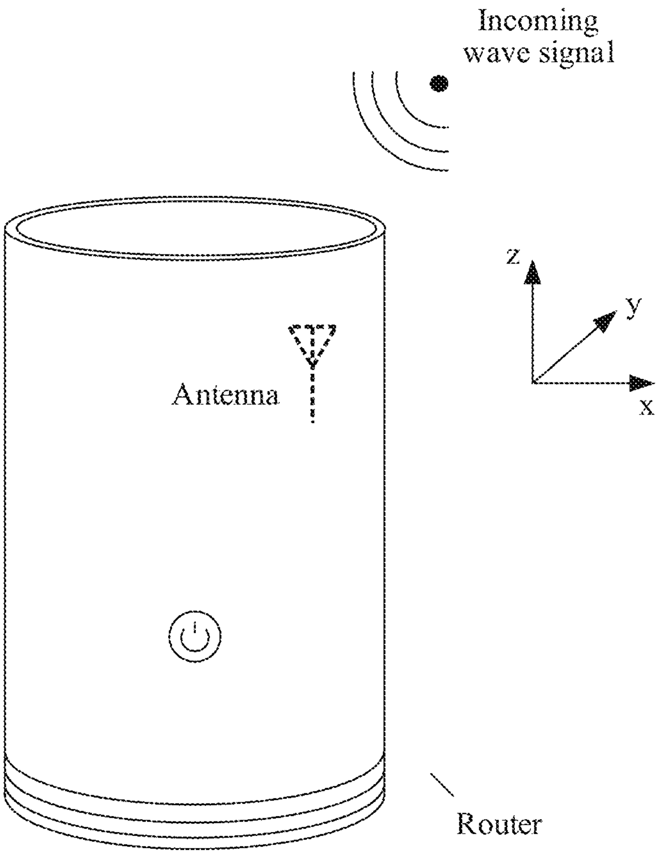
FIG. 1 is a schematic diagram of a scenario in which an electronic device receives a signal.

An electronic device may receive a signal by using an antenna disposed in the antenna. For example, with reference to FIG. 1, the electronic device is a router. An antenna may be disposed in the router, and the antenna may be configured to receive an incoming wave signal shown in FIG. 1, so as to convert the wave signal into an analog signal and provide the analog signal to the router for processing. For example, when the incoming wave signal is sent by an electronic device (such as a mobile phone) that accesses an external network by using the router, the router may implement wireless communication with the mobile phone by using the foregoing function of the antenna, so that the mobile phone can communicate with the external network by using the router.

In different scenarios, the incoming wave signal may have multiple different features. For example, the features may include a polarization direction and the like. It may be understood that the incoming wave signal may be an electromagnetic wave. In a process of transmitting the electromagnetic wave in space, the electromagnetic wave may have an electric field attribute and a magnetic field attribute. A direction of the electric field may be used to define a polarization direction of the electromagnetic wave. The electromagnetic wave is sent by the antenna. In this case, the polarization direction of the electromagnetic wave may also be corresponding to a polarization direction of an antenna that sends the electromagnetic wave.

Figure 2:
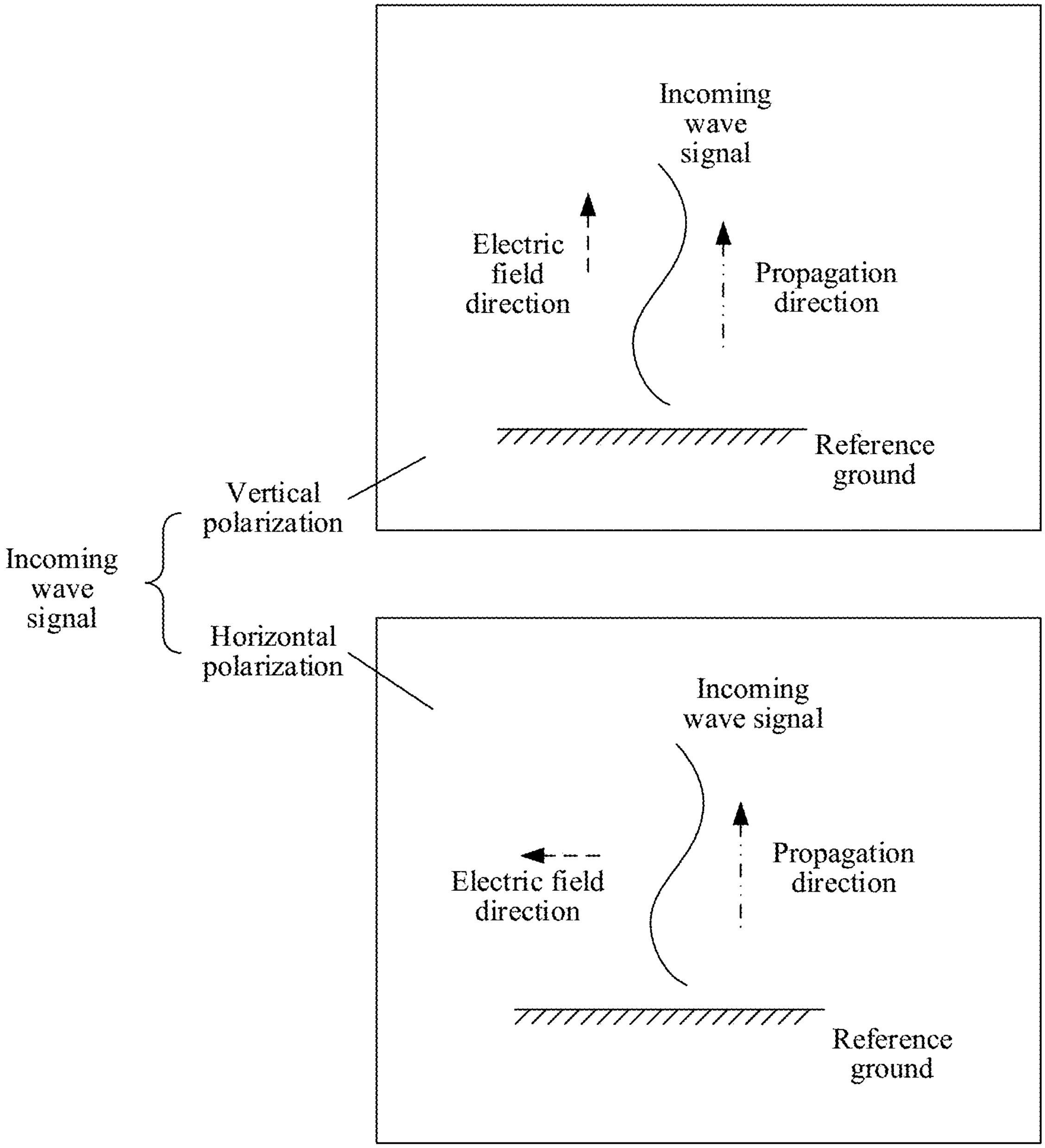
FIG. 2 is a schematic diagram of a signal polarization direction.

Generally, as shown in FIG. 2, an electromagnetic wave incoming wave signal is used as an example. The incoming wave signal may include a horizontally polarized wave and a vertically polarized wave according to a polarization characteristic. The incoming wave signal of the horizontally polarized wave has a horizontal polarization characteristic. As an example, an electric field direction of the horizontally polarized wave is parallel to a plane on which a reference ground of a device that emits the polarized wave is located. Correspondingly, an antenna in a receive end device needs to have a horizontal polarization characteristic to efficiently receive the horizontally polarized wave. The horizontal polarization characteristic of the receive end device may be corresponding to the receive end device, and an electric field direction of an electromagnetic wave emitted by the antenna is parallel to a plane on which a reference ground of the antenna disposed in the receive end device is located. Similarly, an incoming wave signal of a vertically polarized wave may have a vertical polarization characteristic. Correspondingly, the antenna in the receive end device needs to have a vertical polarization characteristic to efficiently receive the vertically polarized wave.

Figure 3:
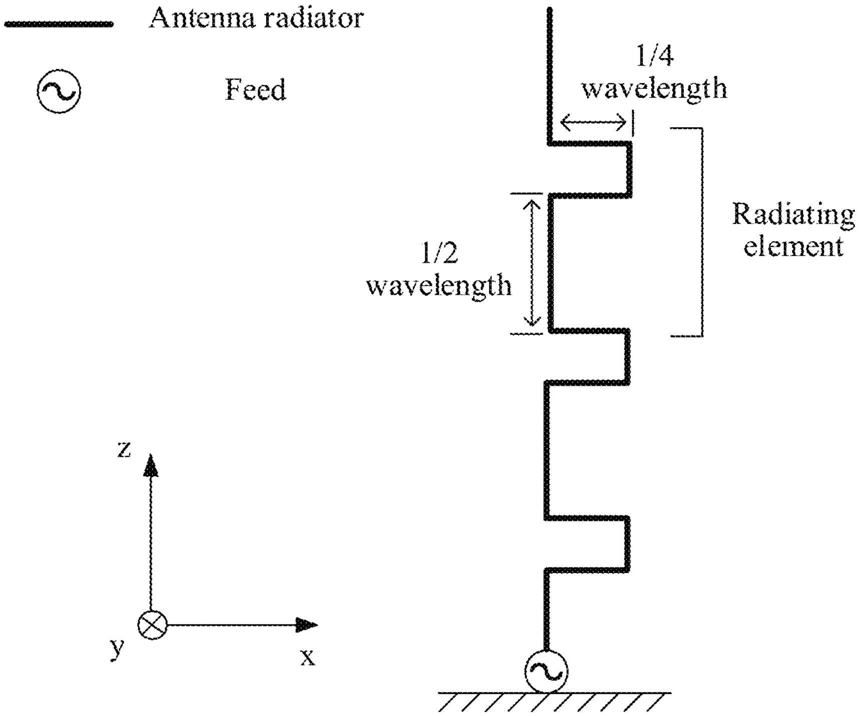
FIG. 3 is a schematic diagram of a vertically polarized antenna.

For example, the incoming wave signal is a vertically polarized wave. The antenna in the receive end device may have a vertical polarization characteristic, so as to receive a vertically polarized wave. FIG. 3 is a schematic diagram of an antenna solution having a vertical polarization characteristic.

As shown in FIG. 3, a radiator of the antenna may be distributed along a z direction. The z direction may be a direction perpendicular to a reference ground. A feed may be disposed at one end of the radiator of the antenna, and the other end may be disposed in suspension. In this example, the radiator of the antenna may be formed by connecting a plurality of radiating elements in series. Each radiating element may include a U-shaped structure and a radiator that is connected to one end of the U-shaped structure and that is in the z direction. An opening direction of the U-shaped structure may be parallel to a direction of the reference ground. For example, the opening direction may be a negative direction of an x-axis. To better perform frequency matching on an operating frequency band, a long side of the U-shaped structure of the radiating element may be close to ¼ of an operating wavelength, and a length of a radiator that is connected to one end of the U-shaped structure and that is in the radiating element may be close to ½ of the operating wavelength. In the antenna, a larger quantity of radiating elements indicates a larger area of the antenna and better radiation performance. For example, in the example in FIG. 3, at least three radiating elements are disposed in the antenna.

When the antenna solution shown in FIG. 3 works, for a radiating element, at some moments, a current direction of a radiator disposed along the z direction may be a positive direction (that is, upward) along the z axis. On the U-shaped structure in the radiating element, currents along the positive direction of the x-axis and currents along the negative direction of the x-axis may be separately distributed on each radiator of ¼ wavelength (that is, two arms of the U-shaped structure). In this case, the current direction of the antenna solution shown in FIG. 3 may be generally distributed along the z axis. Therefore, an electric field direction of an electromagnetic wave emitted by the antenna may be in the negative direction of the z axis. Because the electromagnetic wave whose electric field direction is distributed in the negative direction of the z axis is perpendicular to the plane (that is, an xoy plane) on which the reference ground is located, the antenna solution shown in FIG. 3 has a vertical polarization characteristic. In this case, the antenna solution shown in FIG. 3 can implement efficient reception of a vertically polarized wave. In addition, it can be learned from FIG. 3 that the structure also has a relatively high requirement for a height of the antenna in the z direction, and this has a relatively high requirement for the electronic device on which the antenna is installed in the height direction.

In the foregoing example, a scenario in which the incoming wave signal is received is used as an example for description. It should be understood that in a scenario in which the antenna needs to send a vertically polarized wave, that is, a transmission scenario, requirements for the antenna are similar. That is, an antenna in a transmit end device needs to have a relatively large z-direction height.

However, with a trend of miniaturization design of the electronic device, a z-direction height that the electronic device can provide for the antenna is increasingly limited. This obviously conflicts with a requirement of the current vertically polarized antenna for a relatively large z-direction height.

To obtain a vertical polarization characteristic when a height of an antenna is limited, an embodiment of this application provides an antenna solution, where the antenna solution has a structural feature of a low profile, and has a vertical polarization characteristic. Therefore, the requirement of the vertically polarized antenna for the z-direction height is reduced, so as to meet a requirement of receiving and transmitting a vertically polarized wave in a limited space.

The following first describes an implementation scenario of the antenna solution provided in the embodiments of this application.

The antenna solution provided in this embodiment of this application may be applied to an electronic device of a user, to support a wireless communication function of the electronic device. For example, the electronic device may be a portable mobile device such as a mobile phone, a tablet computer, a personal digital assistant (personal digital assistant, PDA), an augmented reality (augmented reality, AR)\virtual reality (virtual reality, VR) device, and a media player, or the electronic device may be a wearable electronic device such as a smartwatch. A specific form of the device is not specially limited in the embodiments of this application. In some embodiments, the electronic device may also be a device that can transmit and receive a vertically polarized wave, such as a router or a large screen.

Figure 4:
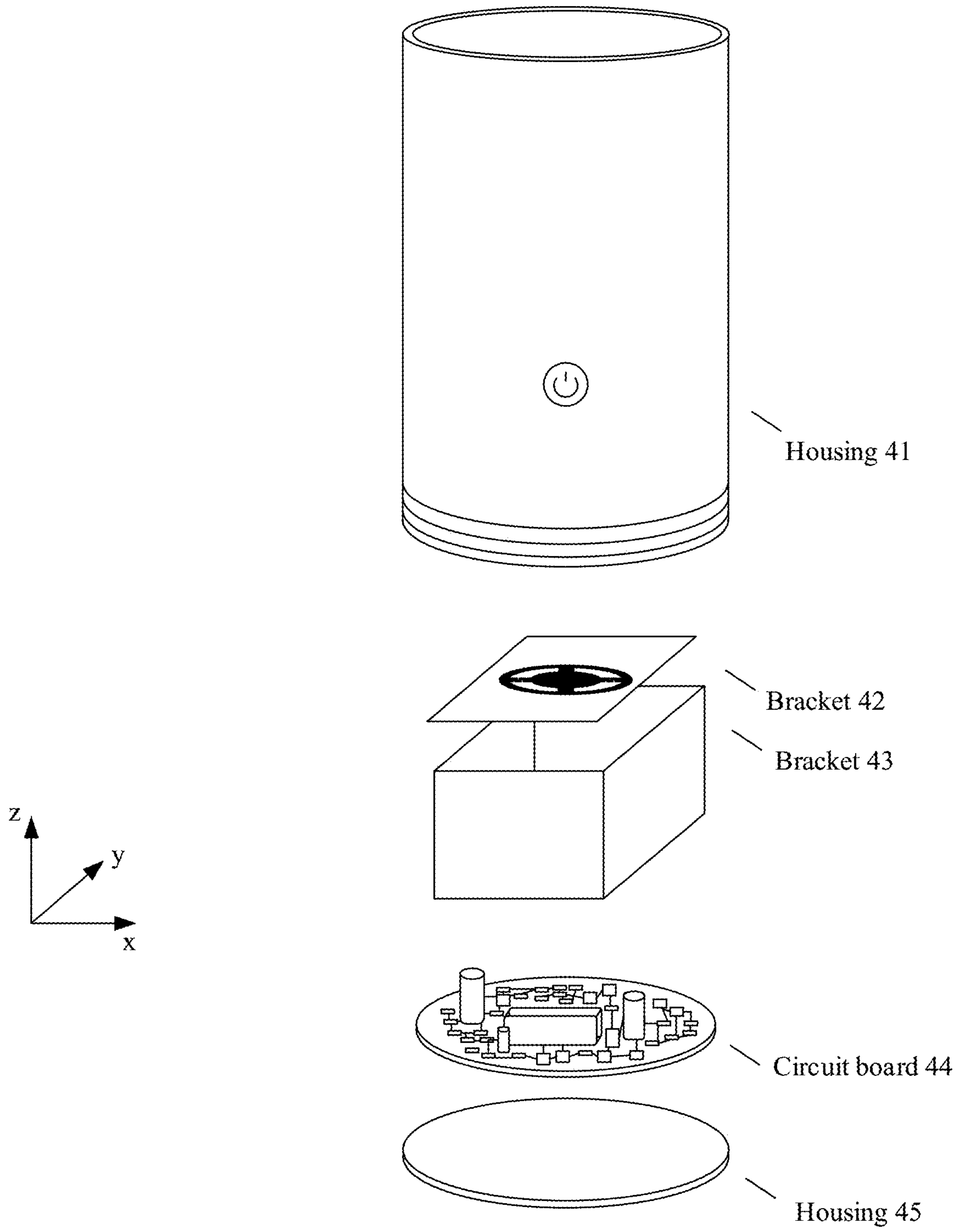
FIG. 4 is a schematic diagram of composition of an electronic device according to an embodiment of this application.

FIG. 4 is a schematic diagram of a structure of an electronic device according to an embodiment of this application. In this example, the structure of the electronic device may be applied to a device such as a router. The router may have a built-in antenna. The built-in antenna may have a vertical polarization characteristic.

As shown in FIG. 4, the electronic device may include a housing 41, a bracket 42, a bracket 43, a circuit board 44, and a housing 45.

The housing 41 and the housing 45 may be used as appearance structural parts of the electronic device. The housing 41 and the housing 45 may be formed of a non-metallic material. For example, the non-metallic material may include a material such as glass, plastic, or ceramic. Functions and structural parts of the electronic device may be disposed inside the housing 41 and the housing 45.

The circuit board 44 in the electronic device may be used as a carrier of functional components in the electronic device. For example, the circuit board 44 may be a printed circuit board (printed circuit board, PCB). A screw hole may be disposed on the circuit board 44, and the circuit board 44 may be fastened to the housing 45 by using the screw hole. In some embodiments, a processor and related circuits and components may be disposed on the circuit board 44. Related circuits and components configured to implement a communication function and/or a routing function may be further disposed on the circuit board 44. For example, communication components such as a modem (modem), a radio frequency module, and antenna matching may be disposed on the circuit board 44. A layer (such as a bottom surface or a top surface of a double-layer board, or a layer in a multi-layer board) in the circuit board 44 may be disposed with a large range of metal to provide a zero-potential reference in the electronic device. For example, the large range of metal may be used as a reference ground for an electronic component such as a radio frequency line, a radio frequency device, or an antenna in the radio frequency module. In the example shown in FIG. 4, the circuit board 44 may be disposed on the xoy plane. In some embodiments, a battery may be further disposed on the circuit board 44. The battery may be configured to supply power to another electronic component, and/or perform processing such as rectification or voltage conversion on an electrical signal connected to an external power supply, so that a processed electrical signal can be used to supply power to an electronic component in the electronic device.

In this example, as shown in FIG. 4, an antenna bracket may be further disposed between the circuit board 44 and the housing 41. In some embodiments, the antenna bracket may include the bracket 42 and the bracket 43. The bracket 43 may be configured to provide support in the xoz plane or the yoz plane. The bracket 42 may be configured to provide support in the xoy plane in a portion that is in the housing 41 and that is away from the circuit board 44. It should be noted that, composition of the antenna bracket that includes the bracket 42 and the bracket 43 shown in FIG. 4 is merely an example. In another embodiment, the antenna bracket may include only one of the bracket 42 or the bracket 43, and a shape of the bracket 42 or the bracket 43 may be different from that shown in FIG. 4. This is not limited in this embodiment of this application.

An antenna may be disposed on the antenna bracket, to support a wireless communication function of the electronic device. For example, the antenna disposed on the antenna bracket may be in any one of the following forms: a flexible printed board (Flexible Printed Circuit, FPC), a metal patch (stamping), laser direct structuring (Laser Direct Structuring, LDS), and the like.

Figure 5:
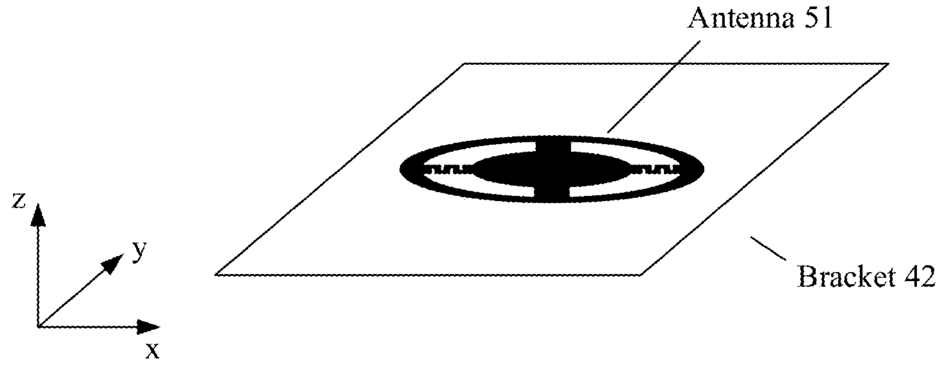
FIG. 5 is a schematic diagram of a disposing position of an antenna in an electronic device according to an embodiment of this application.

For example, because the antenna solution provided in this embodiment of this application has a structural feature of a low profile, a relatively large z-direction size requirement is not required. In a possible implementation, the antenna solution may be disposed on the bracket 42, or the antenna may be disposed inside the housing 41, so as to provide a communication characteristic of vertical polarization for the electronic device. For example, referring to FIG. 5, an antenna 51 may be disposed on the bracket 42. The antenna 51 may have a structural feature of the antenna solution provided in this embodiment of this application, so that the electronic device receives and transmits a vertically polarized wave. Specific structural composition of the antenna 51 is described in detail in subsequent descriptions.

It should be noted that, a feed may also be disposed on the antenna provided in this embodiment of this application. The feed may be coupled to the radio frequency module on the circuit board 44, and is configured to: when a signal is transmitted, transmit a transmit signal from the radio frequency module to the antenna, so that the antenna converts the transmit signal into an electromagnetic wave with a vertical polarization characteristic for transmission. When a signal is received, the feed may transmit, to the radio frequency module, an analog signal converted from a vertically polarized wave received by the antenna, so that the analog signal is transmitted to the processor after undergoing radio frequency domain processing of the radio frequency module, to obtain, through parsing, information carried in the received signal. In subsequent descriptions, the structural feature of the antenna provided in this embodiment of this application is mainly described. In different antenna structures, a feed may be disposed, and a connection between the feed and the circuit board 44 may follow the foregoing description, and details are not described later.

The antenna solution provided in this embodiment of this application may include a plurality of basic radiating elements. Each basic radiating element may be located in the xoy plane, and a plurality of basic radiating elements are separately coupled to obtain the antenna structure provided in this embodiment of this application. In some implementations, the basic radiating element may also be referred to as a zero-order mode unit. A mode generated by the zero-order mode unit may be referred to as a zero-order mode.

The zero-order mode may be corresponding to a mode in which electric field excitation is uniformly distributed between the radiator and the reference ground.

Figure 6:
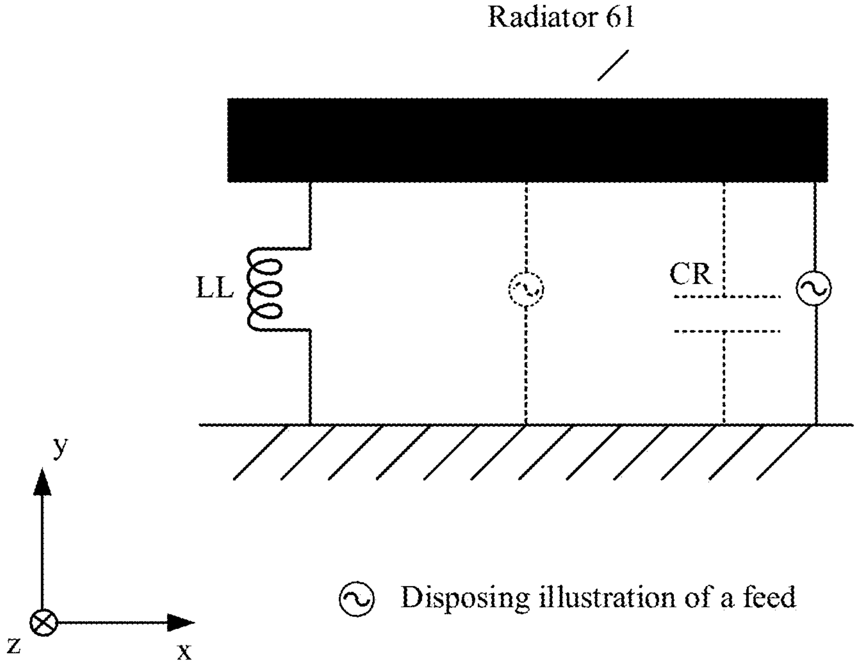
FIG. 6 is a schematic diagram of a basic radiating element according to an embodiment of this application.

For example, FIG. 6 is a schematic diagram of a basic radiating element according to an embodiment of this application. As shown in FIG. 6, the basic radiating element may include a radiator 61, and an inductor LL may be disposed on the radiator 61 for grounding. For example, the inductor LL may be disposed at one end of the radiator 61. In the example in FIG. 6, the radiator 61 and the reference ground may be parallel or nearly parallel, that is, the radiator 61 is not directly connected to the reference ground. In this case, when the basic radiating element works, an equivalent capacitance may be obtained between the radiator 61 and the reference ground. It should be noted that, in different implementations, the inductor LL may be a lumped inductor implemented by using an inductor component shown in FIG. 6, or may be a distributed inductor formed by using a conductive trace.

For the basic radiating element shown in FIG. 6, a feed for exciting the basic radiating element may be disposed on the radiator 61. For example, the feed may be disposed at a midpoint of the radiator 61 or at an end that is far from the ground inductor LL. It may be understood that for a general antenna, for example, an IFA antenna, electric field distribution between a radiator and a reference ground in a working process of the wire antenna is uneven. For example, electric field strength near the feed is weaker than electric field strength far from the feed.

Figure 7:
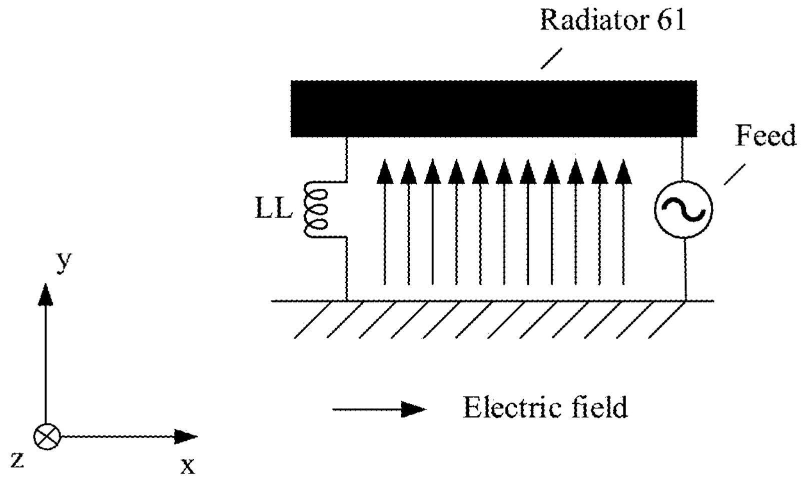
FIG. 7 is a schematic diagram of electric field distribution of a basic radiating element according to an embodiment of this application.

In the basic radiating element in FIG. 6, for example, the feed is disposed at an end that is of the radiator 61 and that is away from the ground inductor LL. Because the inductor LL is disposed at an end far from the feed for grounding, and because of an energy storage characteristic of the inductor for magnetic energy, when a current on the radiator 61 is reversed due to a change of a feed signal, a current change of the radiator 61 is delayed from a change of a voltage, and relatively strong electric field distribution is obtained at the end far from the feed. For example, when the basic radiating element shown in FIG. 6 works, electric field distribution is shown in FIG. 7. It may be learned that a uniformly distributed electric field is obtained between the radiator 61 and the reference ground.

The basic radiating element in this example is only an example, and belongs to a type of magnetic flux loop antenna. In some other implementations, the basic radiating element may be another type of magnetic flux loop antenna. For specific description of the magnetic flux loop antenna, reference may be made to patent applications with application date of Sep. 3, 2021 and application numbers of 2021110346044, 2021110333843, 202111034603X, and 2021110346114. Details are not described herein.

In this embodiment of this application, for example, the basic radiating element is a structure shown in FIG. 6. In this case, the structural feature of the antenna provided in this embodiment of this application may be corresponding to a serial connection to a plurality of basic radiating elements.

Figure 8:
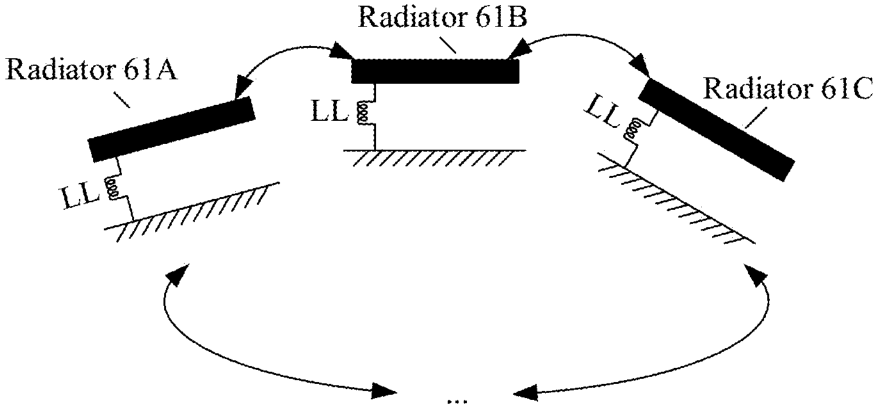
FIG. 8 is a schematic diagram of composition of a terminal antenna according to an embodiment of this application.

For example, with reference to FIG. 6 and FIG. 7, FIG. 8 is a schematic diagram of a structure of antenna composition according to an embodiment of this application. In the example in FIG. 8, a plurality of basic radiating elements may be included. Radiators of the plurality of basic radiating elements may be connected head to tail to form the antenna. In a serial connection, a reference ground corresponding to each basic radiating element may be located on a same side. For example, the plurality of basic radiating elements may include a basic radiating element A, a basic radiating element B, and a basic radiating element C. Referring to FIG. 6, a radiator of the basic radiating element A is a radiator 61A, a radiator of the basic radiating element B is a radiator 61B, and a radiator of the basic radiating element C is a radiator 61C. In this case, in the example shown in FIG. 8, an end that is of the radiator 61A and that is away from the ground inductor may be connected to an end that is of the radiator 61B and that is close to the ground inductor, an end that is of the radiator 61B and that is away from the ground inductor may be connected to an end that is of the radiator 61C and that is close to the ground inductor, and an end that is of the radiator 61C and that is away from the ground inductor may be connected to an end that is of the radiator 61A and that is close to the ground inductor, so that the radiators of the basic radiating elements (the basic radiating elements A, B, and C) may form a closed structure in the xoy plane. If the antenna includes N basic radiating elements, by analogy, the end that is of the radiator 61A and that is far away from the ground inductor may be connected to the end that is of the radiator 61B and that is near the ground inductor, the end that is of the radiator 61B and that is far away from the ground inductor may be connected to the end that is of the radiator 61C and that is near the ground inductor, the end that is of the radiator 61C and that is far away from the ground inductor may be connected to an end that is of a radiator 61N and that is near the ground inductor, and an end that is of the radiator 61N of the basic radiating element N (not shown in FIG. 8) and that is far away from the ground inductor may be connected to an end that is of the radiator 61A and that is close to the ground inductor. Therefore, the radiators of the basic radiating elements may form a closed structure in the xoy plane. Inside the closed structure, a connection to the reference ground may be implemented by using the inductor of each basic radiating element. With reference to FIG. 6 and FIG. 7, each basic radiating element in the antenna solution provided in this embodiment of this application may comply with a radiation feature of a magnetic flux loop antenna. Therefore, in some implementations, the antenna solution provided in this embodiment of this application may also be referred to as a negative dielectric constant antenna (Epsilon-Negative Antenna, ENG) antenna solution.

It should be understood that, with reference to the description in FIG. 7, because a structural feature of the basic radiating element causes each basic radiating element to have a vertical polarization characteristic, the antenna shown in FIG. 8 that is formed by N basic radiating elements in a same plane also has a vertical polarization characteristic. It may be learned that components of the antenna shown in FIG. 8 are all distributed in the xoy plane, and therefore a requirement of a relatively large z-direction height is not required. Therefore, an ENG antenna of a low profile provided in this embodiment of this application can be obtained.

In the foregoing description in FIG. 8, an example in which the basic radiating element has the composition structure shown in FIG. 6 is used. In this embodiment of this application, the basic radiating element may further include another structure.

Figure 9:
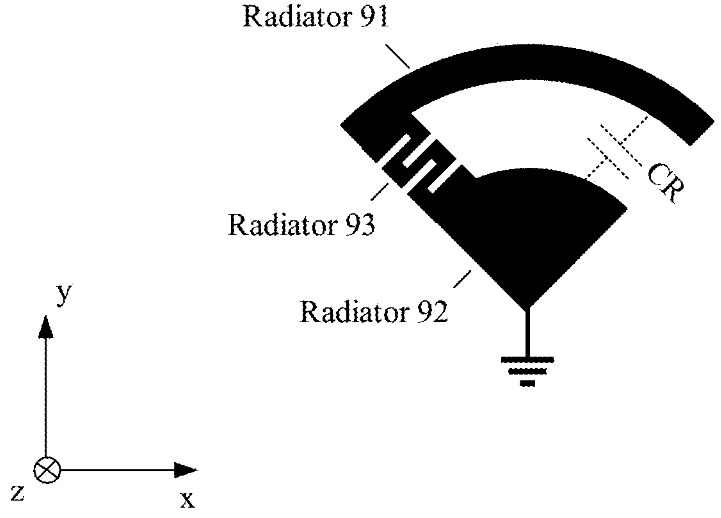
FIG. 9 is a schematic diagram of a basic radiating element according to an embodiment of this application.

For example, FIG. 9 is a schematic diagram of composition of still another basic radiating element according to an embodiment of this application. As shown in FIG. 9, in comparison with the basic radiating element shown in FIG. 6, in this example, the radiator 61 may be deformed into an arc radiator 91. In this way, after a plurality of basic radiators are serially connected, a closed circular ring structure may be obtained by using serial connections of the plurality of arc radiators 91.

In this example, the ground inductor LL may be deformed into a radiator 93. It may be learned that the radiator 93 implements a function of the ground inductor LL in a form of a serpentine line, that is, distributed inductance. In some embodiments, the serpentine line may be described as a structure formed by connecting a plurality of U-shaped structures whose opening directions are 180 degrees different. For details, refer to the radiator 93 shown in FIG. 9. An electrical length of the radiator 93 may be corresponding to an inductance value of the ground inductor LL. By controlling a line width of the serpentine line and a maximum width of a contour of the radiator 93 formed by the serpentine line, an inductance value corresponding to an electrical length of the radiator 93 can be controlled.

In this example, the reference ground may be implemented by using a radiator 92. The radiator 92 may have a sector structure. In this way, after a plurality of basic radiators are serially connected, a connection of a plurality of radiators 92 may obtain an area that is significantly greater than an area of a radiator of a circular ring structure corresponding to the radiator 93. Because of a significant difference in the area, when power is fed to the circular ring structure, a metal region corresponding to the plurality of radiators 92 after being serially connected may be used as an effective and stable reference ground.

Similar to the description in FIG. 6, in the example of the basic radiating element shown in FIG. 9, because the radiator 91 is not directly connected to the radiator 92 serving as the reference ground, a distributed capacitance effect can also be obtained, and is corresponding to the distributed capacitance CR shown in FIG. 9.

Figure 10:
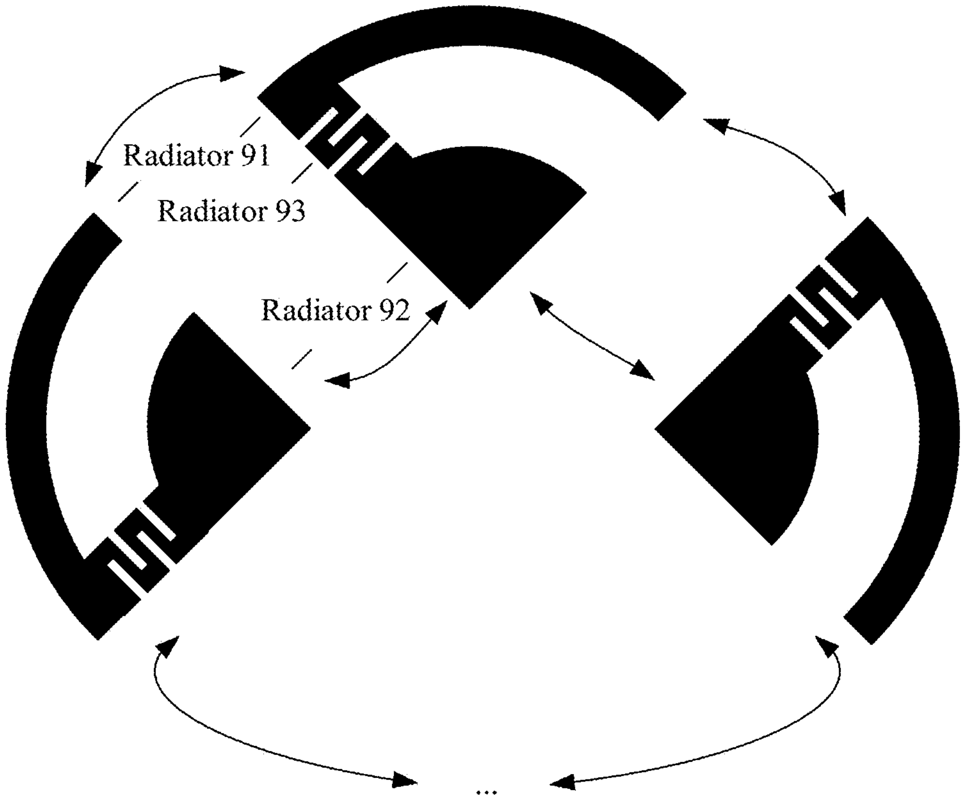
FIG. 10 is a schematic diagram of composition of a terminal antenna according to an embodiment of this application.

On the basis of FIG. 9, FIG. 10 is a schematic diagram of an ENG antenna obtained by serially connecting a plurality of basic radiating elements when the basic radiating elements are formed as shown in FIG. 9. As shown in FIG. 10, radiators 92 of two adjacent basic radiating elements may be serially connected. For example, an end that is close to the radiator 93 and that is of two adjacent basic radiating elements is connected to an end that is away from the radiator 93. Therefore, by using a serial connection of a plurality of basic radiating elements, because the radiators 91 are all arcuate structures, and in a serial connection process, the radiators 92 of each radiating element are all located on a same side of the radiators 91, the plurality of radiators 91 can be serially connected to form a closed circular ring structure. Correspondingly, the plurality of radiators 92 are serially connected to form a circular structure in a closed circular ring structure. The circular ring structure and the circular structure may be connected by using a plurality of radiators 93.

Figure 11:
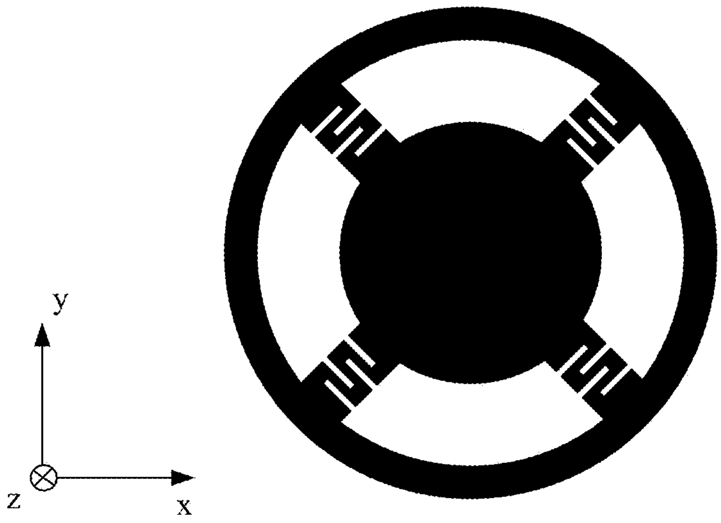
FIG. 11 is a schematic diagram of composition of a terminal antenna according to an embodiment of this application.
Figure 12:
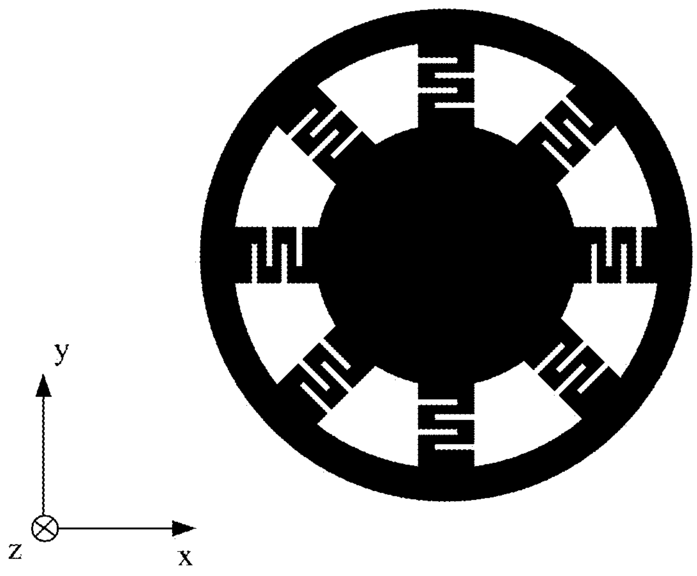
FIG. 12 is a schematic diagram of composition of a terminal antenna according to an embodiment of this application.

As an example, N is equal to 4, that is, four basic radiating elements are serially connected. FIG. 11 is a schematic diagram of an ENG antenna including four basic radiating elements. The ENG antenna includes four basic radiating elements, and a center angle corresponding to an arc length of a radiator 91 of each basic radiating element is 90 degrees. As another example, N is equal to 8, that is, eight basic radiating elements are serially connected. FIG. 12 is a schematic diagram of an ENG antenna including eight basic radiating elements. The ENG antenna includes eight basic radiating elements, and a center angle corresponding to an arc length of a radiator 91 of each basic radiating element is 45 degrees. By analogy, an ENG antenna formed when N is any integer greater than or equal to 2 may be obtained.

It may be learned that, from an overall perspective, with reference to FIG. 11 and FIG. 12, the ENG antenna may have a rotationally symmetric structural feature. The rotational symmetry center of the rotational symmetry is a geometric center of the ENG antenna, that is, a center of a solid circular structure surrounded by N radiators 92 in N basic radiating elements. A rotation angle of the rotational symmetry may be determined according to a quantity of basic radiating elements enclosing the ENG antenna. For example, a rotation angle of the antenna formed by the N basic radiating elements is 360°/N. For example, in an example in which N is equal to 4 in FIG. 11, the rotation angle may be 360°/4=90°. For another example, in an example in which N is equal to 8 in FIG. 12, the rotation angle may be 360°/8=45°.

Descriptions of the ENG antenna provided in the embodiments of this application in FIG. 6 to FIG. 12 are all described from a perspective of a basic radiating element. From another perspective, the ENG antenna provided in this embodiment of this application may further be described from overall structural composition.

Figure 13:
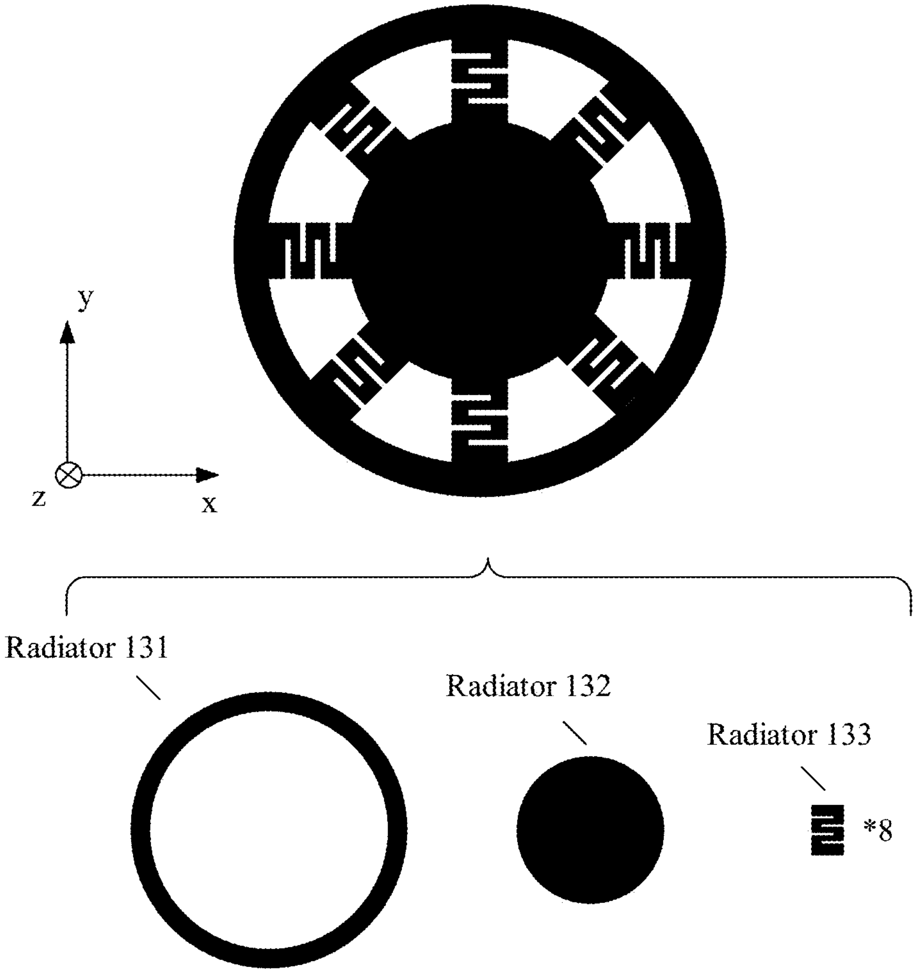
FIG. 13 is a schematic diagram of composition of a terminal antenna according to an embodiment of this application.

For example, FIG. 13 is a schematic diagram of an ENG antenna according to an embodiment of this application. Take N=8 as an example. The antenna may include a radiator 131, a radiator 132, and a plurality of radiators 133. The radiator 131 may be in a closed ring shape. The radiator 132 may be circular. The radiator 132 is disposed inside the radiator 131. An area of the radiator 132 is less than an inner circle area of the annular radiator 131. The radiator 131 and the radiator 132 may be connected by using N radiators 133 therebetween. In this example, N may be equal to 8. The radiator 133 may have a plurality of different structures for implementation, for example, a serpentine line shown in FIG. 13. Radiators 133 may be uniformly disposed in an annular slot between the radiator 131 and the radiator 132. For example, included angles between positions of any two adjacent radiators 133 and a center of the radiator 131 or a center of the radiator 132 are the same. Therefore, the ENG antenna has a rotationally symmetric structural feature.

It should be noted that, in this embodiment of this application, the radiator 132 may function as a zero-potential reference, that is, a reference ground, of the ENG antenna. In a specific implementation process, because the ENG antenna may be disposed on the bracket 42 shown in FIG. 5, the bracket 42 and the circuit board 44 may have a specific height difference in the Z direction. Therefore, in this example, the radiator 132 may not need to be connected to the reference ground on the circuit board 44, but used as an independent reference ground of the ENG antenna.

Descriptions of the ENG antenna provided in the embodiments of this application in FIG. 9 to FIG. 13 are described from a perspective of a radiator. It should be understood that a feed may be further disposed on the ENG antenna provided in this embodiment of this application. For example, with reference to the description in FIG. 6, in the schematic diagrams of the antennas described in FIG. 9 to FIG. 13, a feed may be disposed at a center position of an outer radiator (that is, the radiator 91) of any basic radiating element, or the feed may be disposed at an end that is of any basic radiating element and that is different from the radiator 93.

Figure 14:
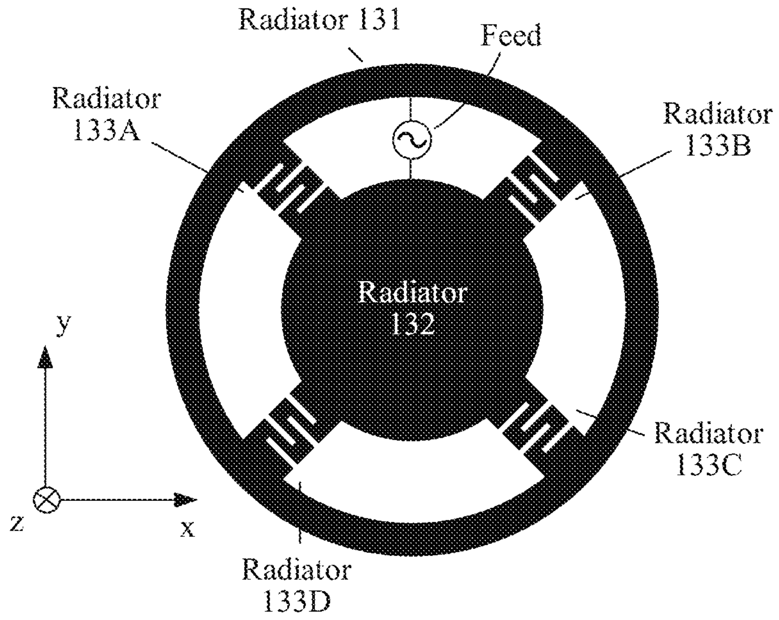
FIG. 14 is a schematic diagram of feed setting of a terminal antenna according to an embodiment of this application.

As an example, the feed may be disposed at the center position of the outer radiator (that is, the radiator 91) of any basic radiating element. For example, with reference to the structural description in FIG. 13, N is equal to 4 as an example. Referring to FIG. 14, the ENG antenna may include a closed annular radiator 131 on an outer side, a circular radiator 132 concentrically disposed with the radiator 131, and four radiators 133 uniformly disposed in an annular slot between the radiator 131 and the radiator 132, for example, a radiator 133A, a radiator 133B, a radiator 133C, and a radiator 133D. As shown in FIG. 14, the feed may be disposed at a middle position between any two adjacent radiators 133. For example, the feed may be disposed at a middle position between the radiator 133A and the radiator 133B, and is connected to the radiator 131, so as to implement excitation of the ENG antenna. In the example shown in FIG. 14, the feed may include a positive electrode and a negative electrode, the positive electrode of the feed may be connected to the radiator 131, and the negative electrode of the feed may be connected to the radiator 132, so as to excite the antenna. In some other embodiments, the positive electrode of the feed may be connected to the radiator 132, and the negative electrode of the feed may be connected to the radiator 131, so as to excite the antenna.

It should be understood that the foregoing description of the feed position in FIG. 14 is performed with reference to the overall description in FIG. 13. From a perspective of the basic radiating element, a structure between the radiator 133A and the radiator 133B may be corresponding to one basic radiating element. An outer radiator corresponding to the basic radiating element may be a part between the radiator 133A and the radiator 133B. Therefore, in the foregoing description, the middle position between the radiator 133A and the radiator 133B is also corresponding to a central position of the basic radiator.

Figure 15:
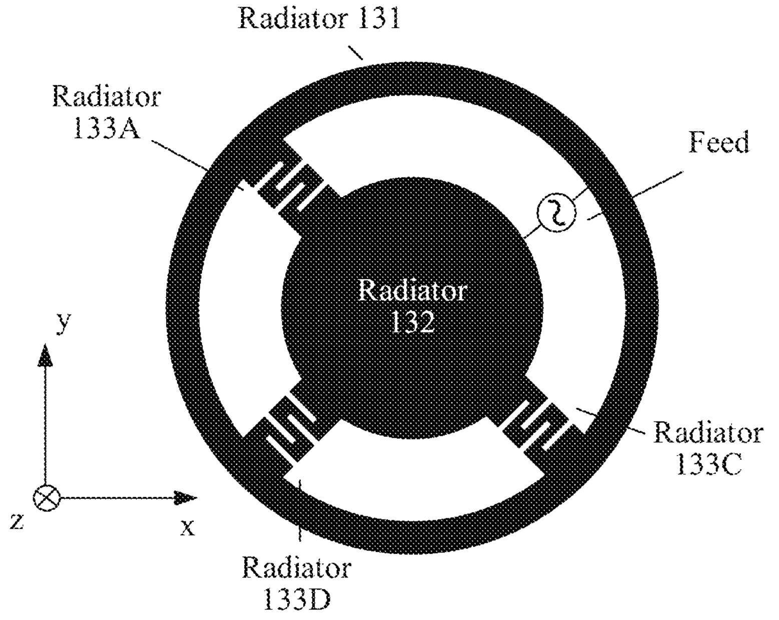
FIG. 15 is a schematic diagram of feed setting of a terminal antenna according to an embodiment of this application.

In some other examples of this application, the feed may be disposed at an end that is of any basic radiating element and that is different from the radiator 93. For example, still with reference to the structural description in FIG. 13, N is equal to 4 as an example. Referring to FIG. 15, the ENG antenna may have a structure similar to that in FIG. 14. In this example, the feed may be disposed at a position of any radiator 133. The radiator 133 at the corresponding position may be no longer disposed. It should be understood that, with reference to the foregoing description, the feed may be disposed at an end that is different from the ground inductor and that is of the basic radiating element. After a plurality of basic radiating elements are serially connected, for two adjacent basic radiating elements, an end that is different from the ground inductor and that is on one basic radiating element corresponds to an end that is close to the ground inductor and that is on the adjacent basic radiating element. Therefore, when the feed is disposed at an end that is of a basic radiating element and that is away from the ground inductor, a position of the feed may coincide with a position of an adjacent ground inductor. In this way, from an overall perspective of the ENG antenna, a ground inductor at a corresponding position may be replaced with a feed, so as to feed power to the antenna. As shown in FIG. 15, a feed may be disposed at a position of the radiator 133B, and the corresponding radiator 133B may be no longer disposed. Similarly, when a position of a feed overlaps with that of another radiator 133, the corresponding radiator 133 may be no longer disposed.

Similar to N=4 in FIG. 15, when N is equal to another integer greater than or equal to 2, a corresponding ENG antenna may also be obtained based on a similar mechanism.

Figure 16:
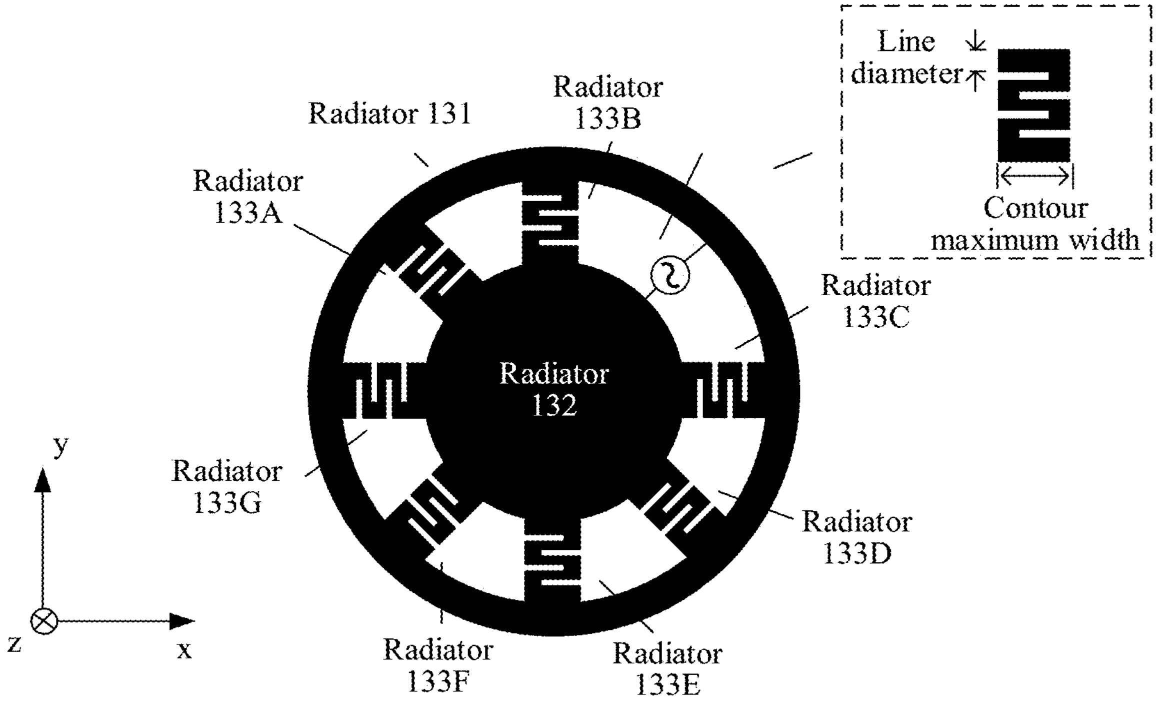
FIG. 16 is a schematic diagram of feed setting of a terminal antenna according to an embodiment of this application.

For example, FIG. 16 shows an ENG antenna when N is equal to 8. In the example in FIG. 16, the radiator 133 corresponding to the ground inductor function may include seven radiators in total: a radiator 133A to a radiator 133G. The value less than N is because in this example, the feed is disposed at a position between the radiator 133B and the radiator 133C, and the position may be corresponding to an end that is of a basic radiating element and that is away from the ground inductor. That is, when the feed is disposed at a position on the basic radiating element different from the two end positions, in the ENG antenna when N is equal to 8, one radiator 133 may be further disposed at the feed position shown in FIG. 16, and is configured to connect the radiator 131 and the radiator 132.

Figure 17:
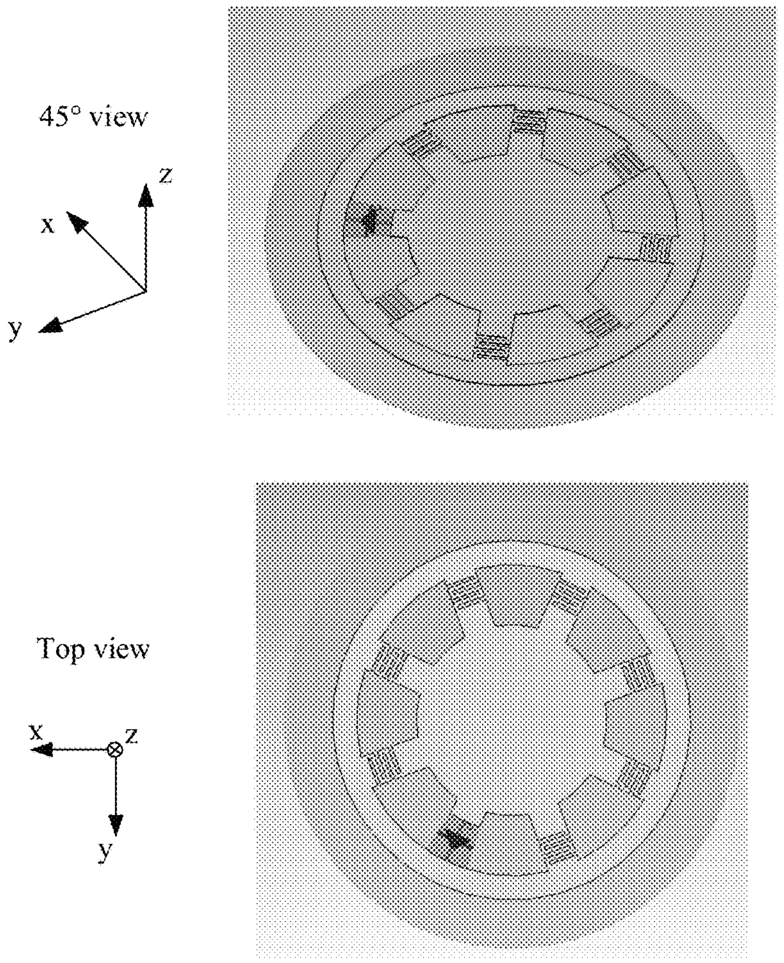
FIG. 17 is a schematic diagram of different angles of a terminal antenna in actual implementation according to an embodiment of this application.

In a specific implementation, the ENG antenna provided in this embodiment of this application may be disposed on the electronic device by using an FPC or the like. For example, the ENG antenna has the composition shown in FIG. 16. FIG. 17 is a diagram of two different perspectives when an ENG antenna is disposed on an electronic device according to an embodiment of this application. Diagrams of an antenna at a 45° view and a top view are provided. When the antenna is an FPC, a radiation function of the radiator part may be implemented by using a metal (such as copper or silver) region disposed on an FPC substrate. Correspondingly, the negative electrode of the feed may be connected to an inner radiator (for example, the radiator 132) of the antenna, and the positive electrode of the feed may be connected to an outer radiator (for example, the radiator 131) of the antenna. Therefore, a feeding direction from inside to outside is implemented.

In the foregoing example, the structural feature of the ENG antenna provided in this embodiment of this application is mainly described. The following describes the radiation feature of the ENG antenna provided in this embodiment of this application with reference to the accompanying drawings.

For example, the basic radiating element corresponding to the ENG antenna provided in this embodiment of this application has the structure shown in FIG. 9. From a perspective of an equivalent circuit, referring to FIG. 18, the basic radiating element may be equivalent to an effect of a series inductor LR, a parallel inductor LL, and a parallel capacitor CR between ports.

The inductor LR may be corresponding to an electrical length of the radiator 91. The inductor LL may be corresponding to a ground inductor between the radiator and the reference ground (for example, the radiator 92). For example, in the example in FIG. 17, the ground inductor may be corresponding to the radiator 93. A capacitor CR may be corresponding to an equivalent capacitor between the radiator 91 and the radiator 92. Based on the equivalent circuit, a resonance characteristic of the basic radiating element can be obtained through analysis.

Figure 18:
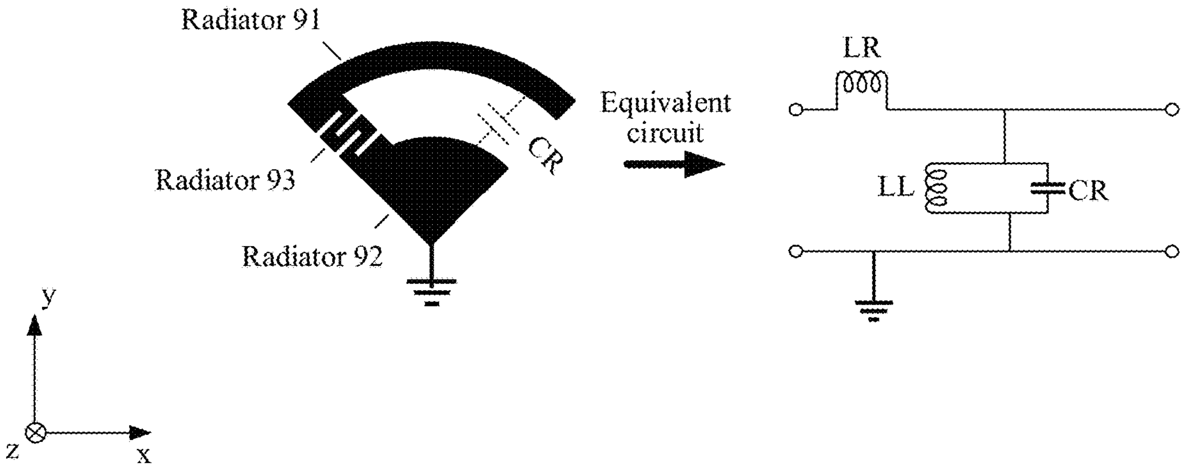
FIG. 18 is a schematic diagram of equivalent analysis of a basic radiating element according to an embodiment of this application.

For example, the resonance characteristic of the basic radiating element may be obtained according to a wave equation and the foregoing equivalent circuit. The wave equation may be shown in the following formula (1).

$$\beta(w) = \sqrt{w^2 \times LR \times CR - \frac{LR}{LL}}. \quad \text{Formula (1)}$$

β(w) is a phase constant and may be set to 0. ω is a frequency, and LR, CR, and LL respectively correspond to an inductance value, a capacitance value, and an inductance value in the equivalent circuit shown in FIG. 18. It can be learned that, if ω is set to an operating frequency, and the phase constant is set to 0, respective values of LR, CR, and LL may be calculated, and used as size limitation references of the basic radiating element.

Figure 19:
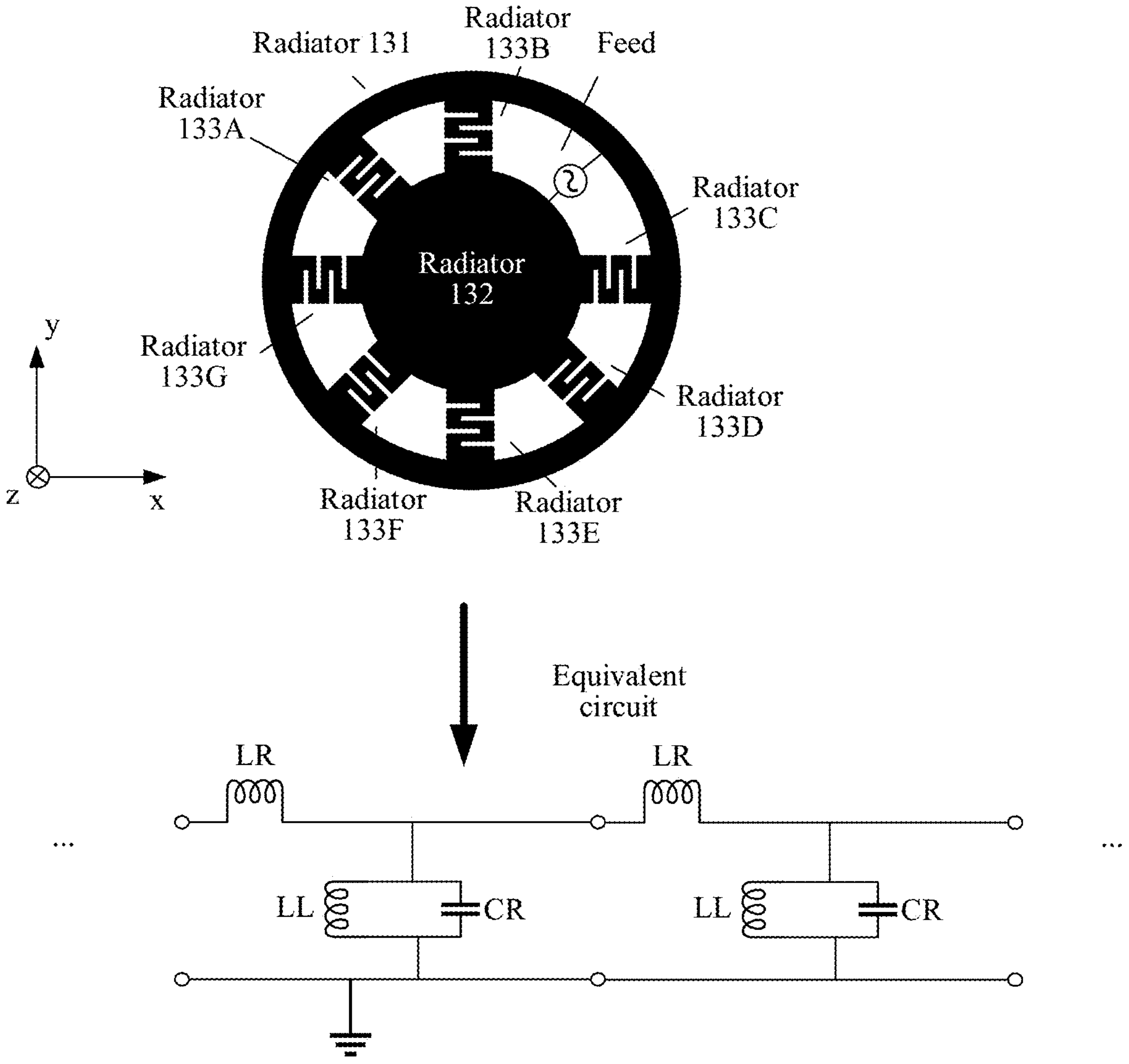
FIG. 19 is a schematic diagram of equivalent analysis of a terminal antenna according to an embodiment of this application.

With reference to the radiation characteristic analysis of one basic radiating element in FIG. 18, an equivalent circuit corresponding to the ENG antenna formed by the plurality of basic radiating elements may be the case shown in FIG. 19. That is, the ENG antenna obtained through serial connection of the plurality of basic radiating elements may be corresponding to the serial connection of the plurality of equivalent circuits shown in FIG. 18. With reference to the foregoing description, when the ENG antenna works, a uniformly distributed electric field may be separately formed between the LR and the reference ground, and the electric field is corresponding to a same phase in a same structure of each basic radiating element. Therefore, when the ENG antenna works, the ENG antenna can have a uniform vertical polarization characteristic in all directions. That is, when the ENG antenna works, a vertical polarization characteristic and omni-directivity can be both implemented.

It should be noted that, the radiation characteristic of the ENG antenna formed by the basic radiating element may be related to the basic radiating element. For example, an operating frequency band of the ENG antenna may be determined according to LR, CR, and LL of any one of the basic radiating elements.

As an example, the ENG antenna provided in this embodiment of this application works on a 5G Wi-Fi frequency band (for example, 5150 MHz-5850 MHz). For composition of the basic radiating element, an inductor LR corresponding to the radiator 91 may be included in a range of [1 nH, 4 nH], an equivalent capacitor CR between the radiator 91 and the radiator 92 may be included in a range of [0.1 pF, 1 pF], and an equivalent inductor LL of the radiator 93 may be included in a range of [1 nH, 5 nH].

As still another example, the ENG antenna provided in this embodiment of this application works on a medium or high frequency band (for example, 1710 MHz-2700 MHz) as an example. For composition of the basic radiating element, an inductor LR corresponding to the radiator 91 may be included in a range of [3 nH, 10 nH], an equivalent capacitor CR between the radiator 91 and the radiator 92 may be included in a range of [0.3 pF, 2 pF], and an equivalent inductor LL of the radiator 93 may be included in a range of [3 nH, 15 nH].

It should be understood that, for another operating frequency band, cases of corresponding CR, LL, and LR may be determined with reference to formula (1) in the foregoing description, and corresponding structural sizes may be separately set corresponding to the CR, LL, and LR.

It should be noted that, in this embodiment of this application, a name of each component may be different from a name in the foregoing description. For example, FIG. 13 is used as an example. The radiator 131 may also be referred to as a first radiator, and the radiator 132 may also be referred to as a second radiator. The radiator 133 may also be a specific implementation of an inductor component. From a perspective of a structure, the radiator 133 may also be described as a metal body that is disposed in a slot between the first radiator and the second radiator and that is uniformly distributed in a serpentine line shape.

The following provides a simulation result of the antenna shown in FIG. 16, FIG. 17, or FIG. 19, so as to describe an actual working situation of the antenna, and further to demonstrate the vertical polarization characteristic and better radiation performance of the ENG antenna provided in this embodiment of this application. For example, the operating frequency band of the antenna is 5G Wi-Fi. With reference to the description of FIG. 16 to FIG. 19, in this example, the antenna is implemented by a copper-clad FPC, an inner circle radius of the radiator 131 may be 10 mm-25 mm, a radius of the radiator 132 may be 8 mm-15 mm, and a maximum width of a contour of the radiator 133 may be 1 mm-6 mm. When the radiator 133 is implemented by using a serpentine line distributed inductor, a wire diameter of the radiator 133 may be between 0.1 mm-0.3 mm. For example, the inner circle radius of the radiator 131 may be 19 mm, the radius of the radiator 132 may be 12 mm, and the maximum width of the contour of the radiator 133 may be 3 mm.

Figure 20:
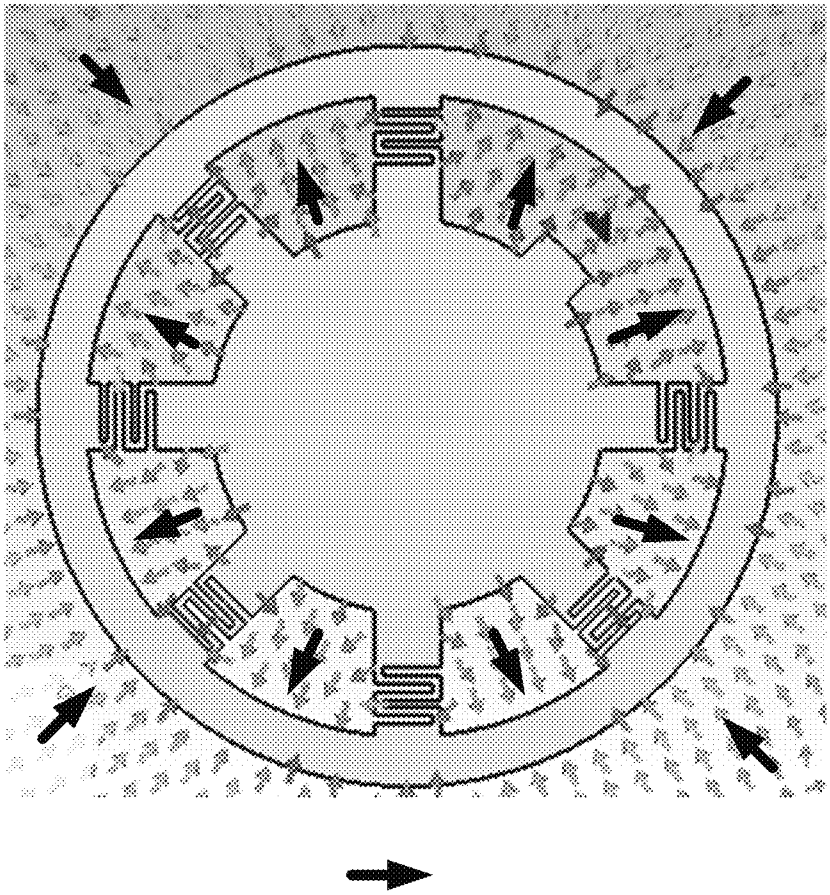
FIG. 20 is a schematic diagram of electric field simulation of a terminal antenna according to an embodiment of this application.
Figure 21:
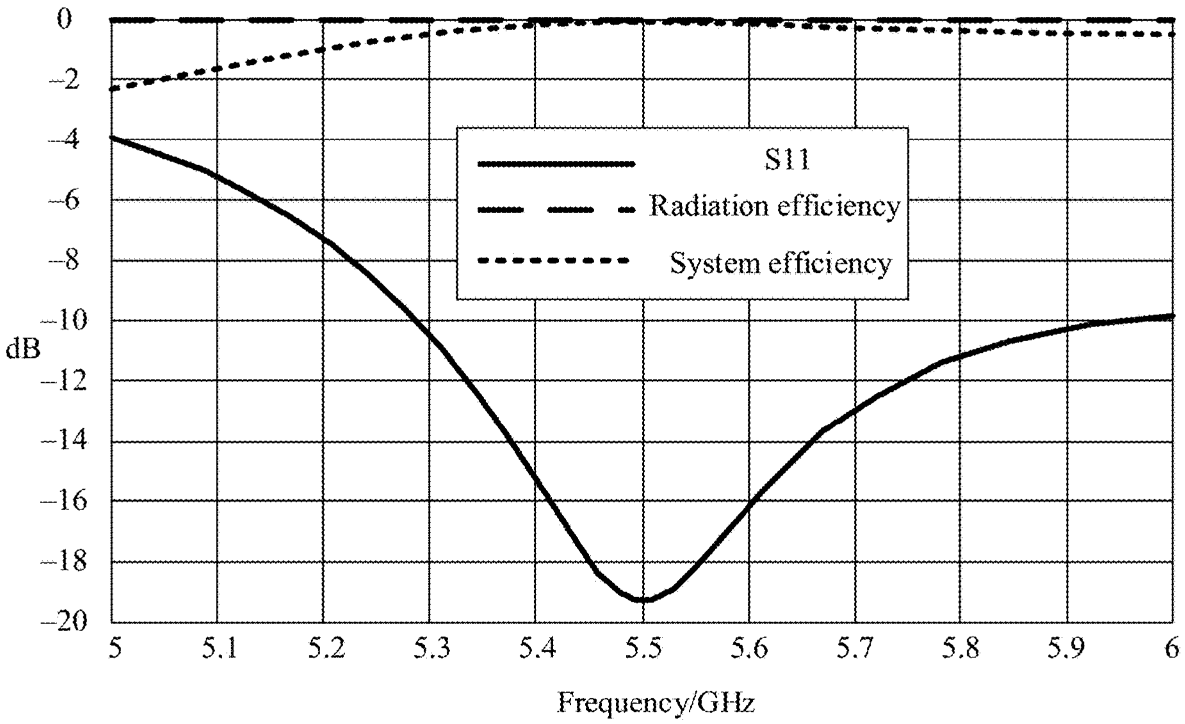
FIG. 21 is a schematic diagram of S parameter simulation of a terminal antenna according to an embodiment of this application.

FIG. 20 is a schematic diagram of electric field simulation of an ENG antenna according to an embodiment of this application. It may be learned that at a current moment, a transmit end of an electric field may be on a reference ground, and an incident end of the electric field may be on a radiator of a basic radiating element. Therefore, from a perspective of a far field, the electric field may be radiated outwards near the reference ground perpendicular to a plane on which the reference ground is located, and the electric field may be radiated inwards near the radiator of the basic radiating element perpendicular to a plane on which the radiator is located (that is, the plane on which the reference ground is located), and the radiation enters the basic radiating element. That is, in each part of the antenna, the electric field direction is perpendicular to the plane on which the reference ground is located. Therefore, the antenna has a vertical polarization characteristic. FIG. 21 is a schematic diagram of S parameter simulation of an ENG antenna according to an embodiment of this application. As shown in FIG. 21, a return loss (S11) of the antenna is presented as a single resonance, a deepest point is near 5.5 GHz, and a −12 dB bandwidth exceeds 400 MHz. Radiation efficiency of the antenna (that is, maximum efficiency that can be achieved when a port is exactly matched) is close to 0 dB in a 5G Wi-Fi frequency band. System efficiency (that is, actual efficiency in a current port matching case) of the antenna exceeds −2 dB in the 5G Wi-Fi frequency band, and an efficiency bandwidth is relatively good. Therefore, the antenna shown in FIG. 16, FIG. 17, or FIG. 19 can provide better radiation performance to cover an operating frequency band.

Figure 22:
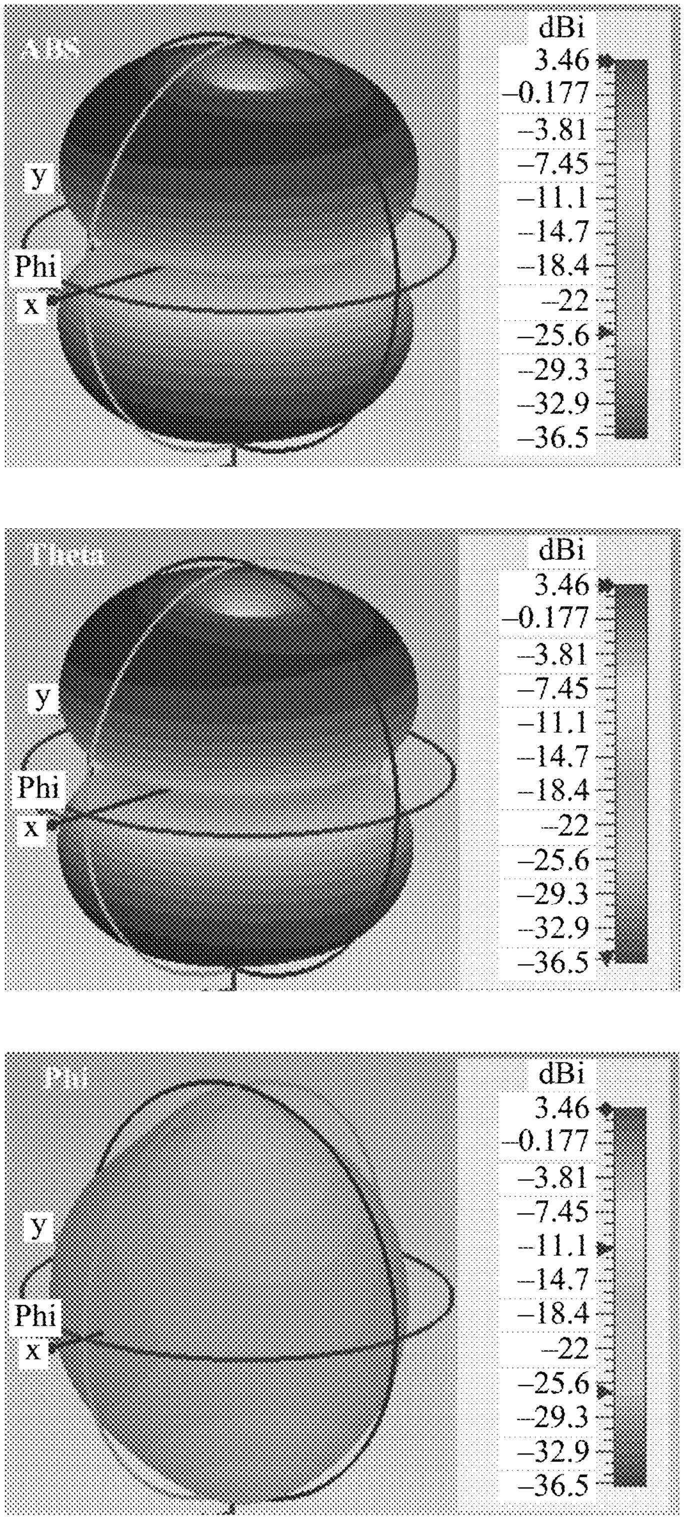
FIG. 22 is a schematic diagram of pattern simulation of a terminal antenna according to an embodiment of this application.

FIG. 22 is a schematic diagram of simulation of an ENG antenna in two polarization directions (for example, Theta and Phi) according to an embodiment of this application. A schematic diagram of an absolute value (absolute value, ABS) of a directivity pattern when the ENG antenna is radiated as a whole is further shown in FIG. 22. As shown in FIG. 22, shapes and amplitudes of directivity patterns of the ABS and the Theta component are basically the same, a gain of a pitch angle is the largest at about 60 degrees, and zero points of the directivity patterns are on an equatorial plane and on two poles. Other directions have a better omnidirectional coverage capability. Directivity pattern distribution in the Phi direction is weaker than those in the ABS and Theta directions. Therefore, vertical components in gain distribution indicated by the directivity pattern are almost the same as those in total gain distribution, which therefore conforms to the vertical polarization characteristic. In addition, all components of the antenna are disposed in one plane (for example, the xoy plane), and therefore, the antenna has a low profile characteristic.

As described in the equivalent circuit in FIG. 18 and FIG. 19, an inductor LL, a capacitor CR, and an inductor LR that constitute a basic radiating element of the ENG antenna have significant impact on a working condition of the entire antenna. The following describes resonance offset of the ENG antenna as the inductor LL, the capacitor CR, and the inductor LR change in conjunction with simulation comparison.

Figure 23:
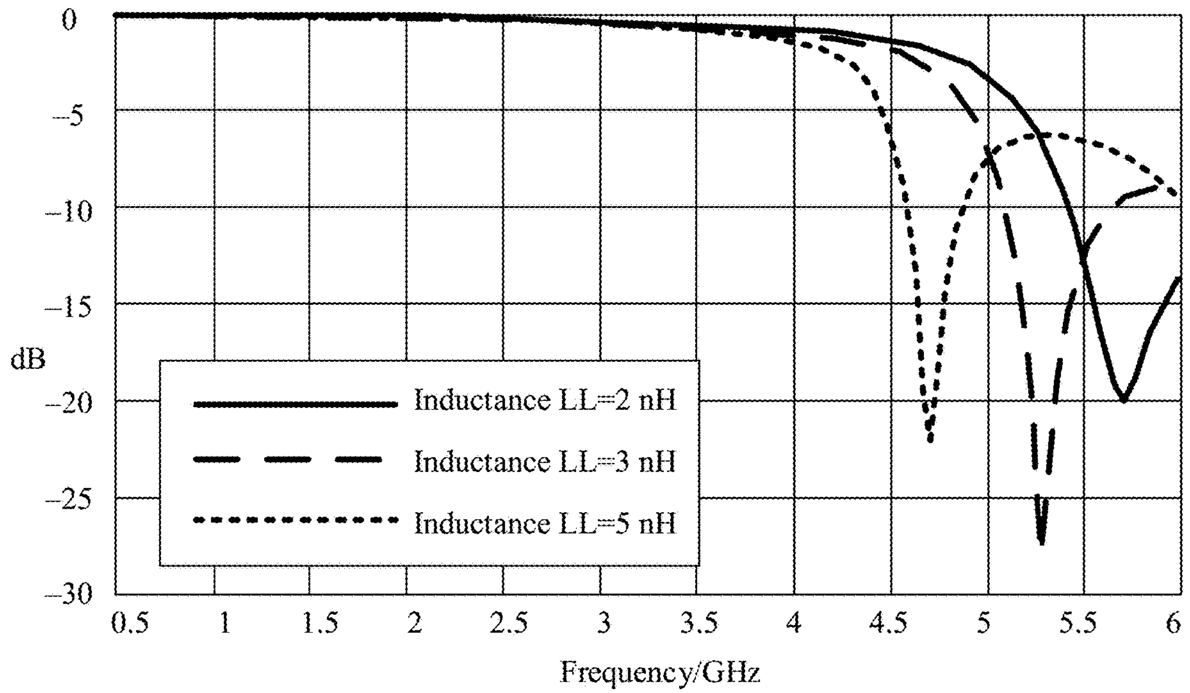
FIG. 23 is a schematic diagram of S11 simulation comparison of an inductor LL of a basic radiating element in different cases according to an embodiment of this application.
Figure 24:
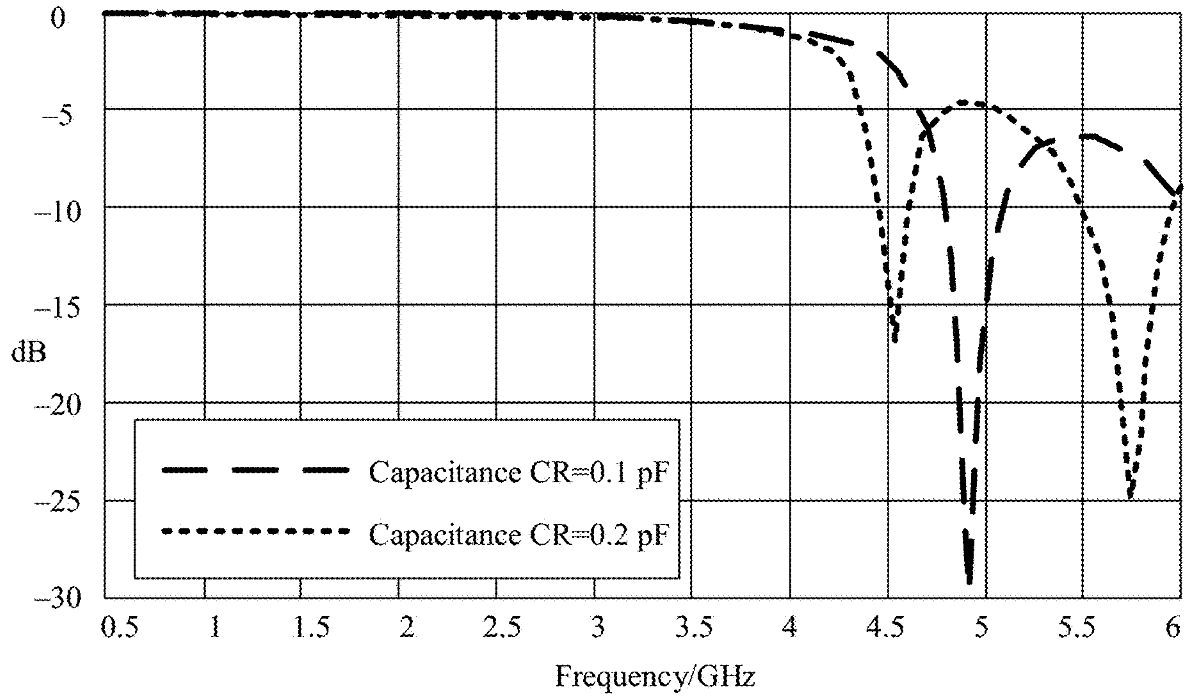
FIG. 24 is a schematic diagram of S11 simulation comparison of a capacitor CR of a basic radiating element in different cases according to an embodiment of this application.
Figure 25:
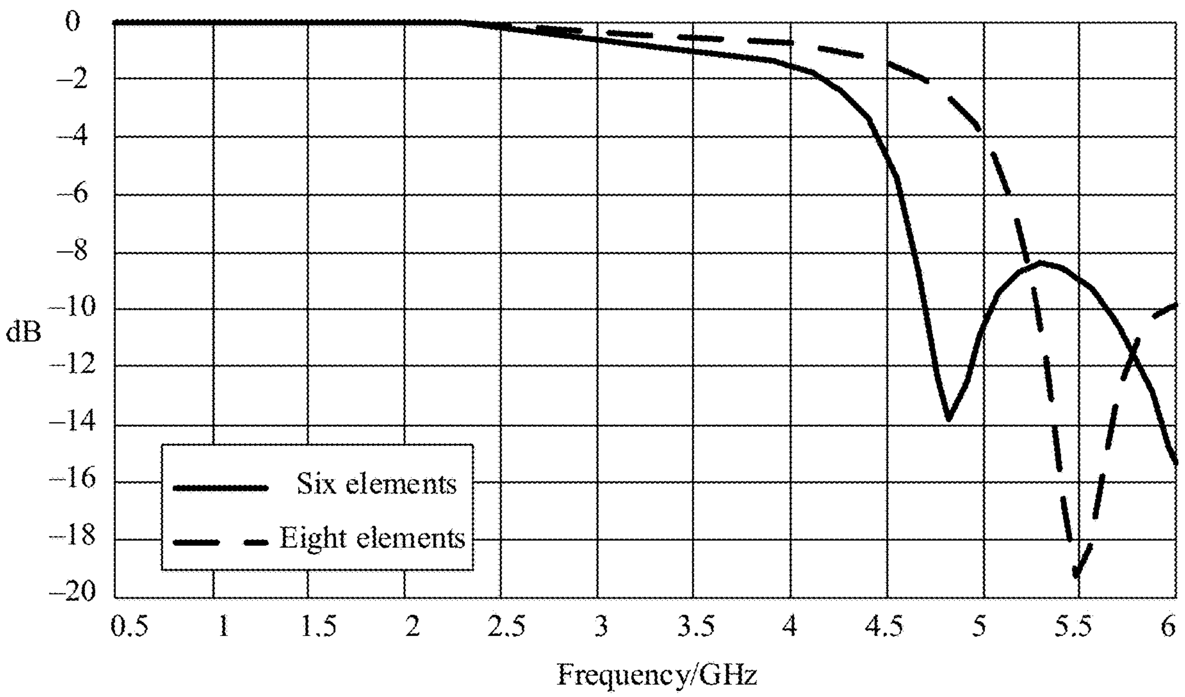
FIG. 25 is a schematic diagram of S11 simulation comparison of an inductor LR of a basic radiating element in different cases according to an embodiment of this application.

For example, FIG. 23 shows comparison of S11 when the inductor LL is 2 nH, 3 nH, and 5 nH when other parameters are the same. It can be seen that when a value of the inductor LL is smaller, a resonant frequency is higher. FIG. 24 shows comparison of S11 when the capacitor CR is 0.1 pF and 0.2 pF when other parameters are the same. It can be seen that when a value of the capacitor CR is smaller, a resonant frequency is higher. FIG. 25 shows comparison of S11 when six basic radiating elements and eight basic radiating elements constitute the antenna when an external size of the antenna remains unchanged. It may be understood that, when the external size remains unchanged, a larger quantity of basic radiating elements indicates a smaller length of a corresponding radiator 91, that is, a smaller LR. That is, an LR of an antenna formed by eight basic radiating elements (eight elements for short) is smaller than an LR of an antenna formed by six elements. As shown in FIG. 25, resonance of the antenna formed by six basic radiating elements is lower in frequency than resonance of the antenna formed by eight basic radiating elements. Therefore, when the inductor LR is smaller, a resonant frequency is higher.

That is, by adjusting a value of any one of the LR, the CR, and the LL to increase, an objective of tuning an operating frequency band of the ENG antenna to a low frequency can be achieved. Correspondingly, by adjusting the value of any one of the LR, the CR, and the LL to decrease, an objective of tuning the operating frequency band of the ENG antenna to a high frequency can be achieved. With reference to the foregoing formula (1), when β(w) is set to 0, a relationship between the LR, the CR, or the LL and ω is inversely changed, which also conforms to the foregoing simulation result.

Therefore, according to the foregoing description and verification in FIG. 6 to FIG. 25, a person skilled in the art should have a comprehensive and clear understanding of the ENG antenna provided in this embodiment of this application. It should be noted that, in the foregoing description, the ENG antenna formed by the N basic radiating elements may be circular. In some other embodiments of this application, based on structures of different basic radiating elements, the ENG antenna obtained after serial connection of the basic radiating elements may also be in another shape. In addition, in some implementations, each basic radiating element that constitutes the ENG antenna may also include one or more parts that have different structures from those of other basic radiating elements. The part may be flexibly disposed according to an actual environment (for example, structure avoidance). Therefore, although a directivity pattern of a corresponding direction is distorted to some extent, the vertical polarization characteristic of the entire antenna is not affected. Therefore, this case should also be included within the protection scope of the solution provided in this embodiment of this application.

Figure 26:
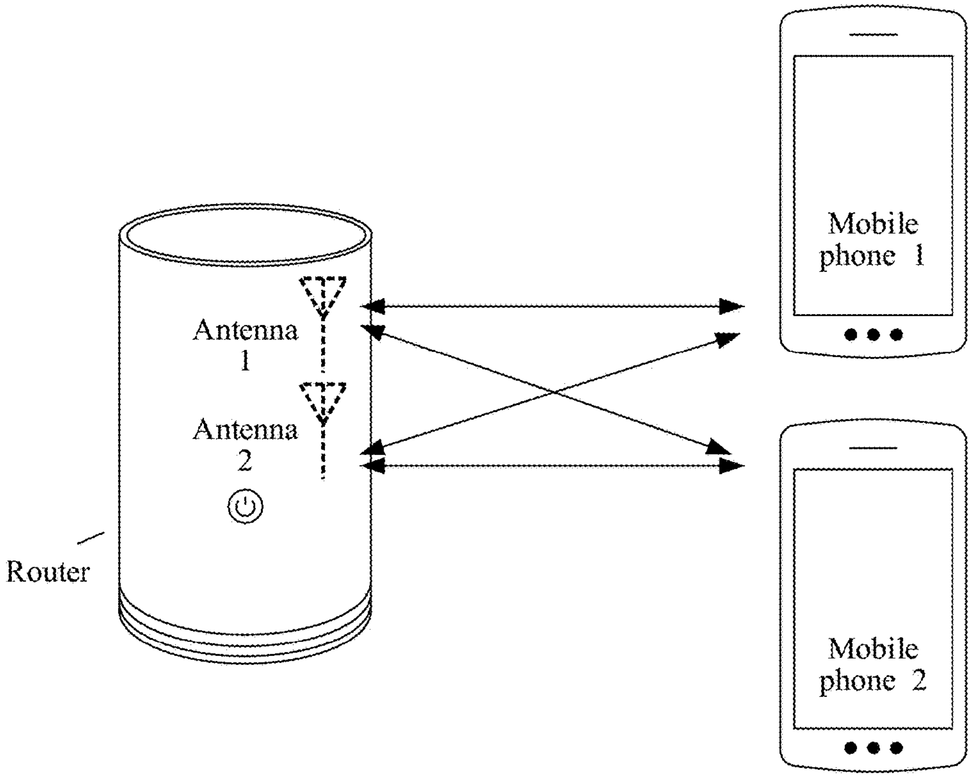
FIG. 26 is a schematic diagram of a MIMO scenario.

In the foregoing example, a low-profile vertically polarized antenna solution implementation is provided. As an application, the ENG antenna solution may further form a new MIMO antenna system together with another horizontal polarized antenna solution. Two antennas may be separately disposed with a feed, to form a multiple-input multiple-output (MIMO) system. For example, FIG. 26 is a schematic diagram of a MIMO communication scenario. In this example, an example in which communication electronic devices include a plurality of mobile phones and a router is used. In a MIMO scenario, for example, the mobile phone sends a signal to the router to perform communication. A mobile phone 1 may communicate with an antenna 1 and an antenna 2 in the router. In addition, a mobile phone 2 may also communicate with the antenna 1 and the antenna 2 in the router. In this way, for the router, the antenna 1 and the antenna 2 may simultaneously work to receive and transmit a signal, thereby improving a throughput. For the mobile phone 1 or the mobile phone 2, because communication may be simultaneously performed with two antennas of the router, reliability and a throughput in the communication process can also be improved.

Because of a position, a posture, and the like of the mobile phone, a relative position relationship between the mobile phone 1 or the mobile phone 2 and the antenna 1 or the antenna 2 in the router may be different or changed. Therefore, a signal between the mobile phone 1 (or the mobile phone 2) and the antenna 1 (or the antenna 2) may be a vertically polarized wave or a horizontally polarized wave. In this case, to implement efficient communication with each mobile phone, the router needs to be able to effectively receive both the vertically polarized wave and the horizontally polarized wave. Therefore, the MIMO antenna system formed by the antenna 1 and the antenna 2 in the router needs to have both a vertical polarization characteristic and a horizontal polarization characteristic.

In an embodiment of this application, a MIMO antenna system is provided, and the MIMO antenna system may be disposed in a router. Based on the ENG antenna in the foregoing description, with reference to a horizontally polarized antenna such as an MNG antenna, the MIMO antenna system can provide a vertical polarization characteristic and a horizontal polarization characteristic. However, due to a structural characteristic of a low profile of the ENG antenna, a size requirement on the height direction (for example, the Z direction) of the MIMO antenna system can be greatly reduced. In the following description, an example in which the horizontal polarization characteristic is provided by using the MNG antenna is used. The ENG antenna may also be referred to as a first antenna, and corresponds to any one of the antenna 1 or the antenna 2 in FIG. 26. The MNG antenna may be referred to as a second antenna, and corresponds to another antenna different from the ENG antenna in FIG. 26.

Figure 27:
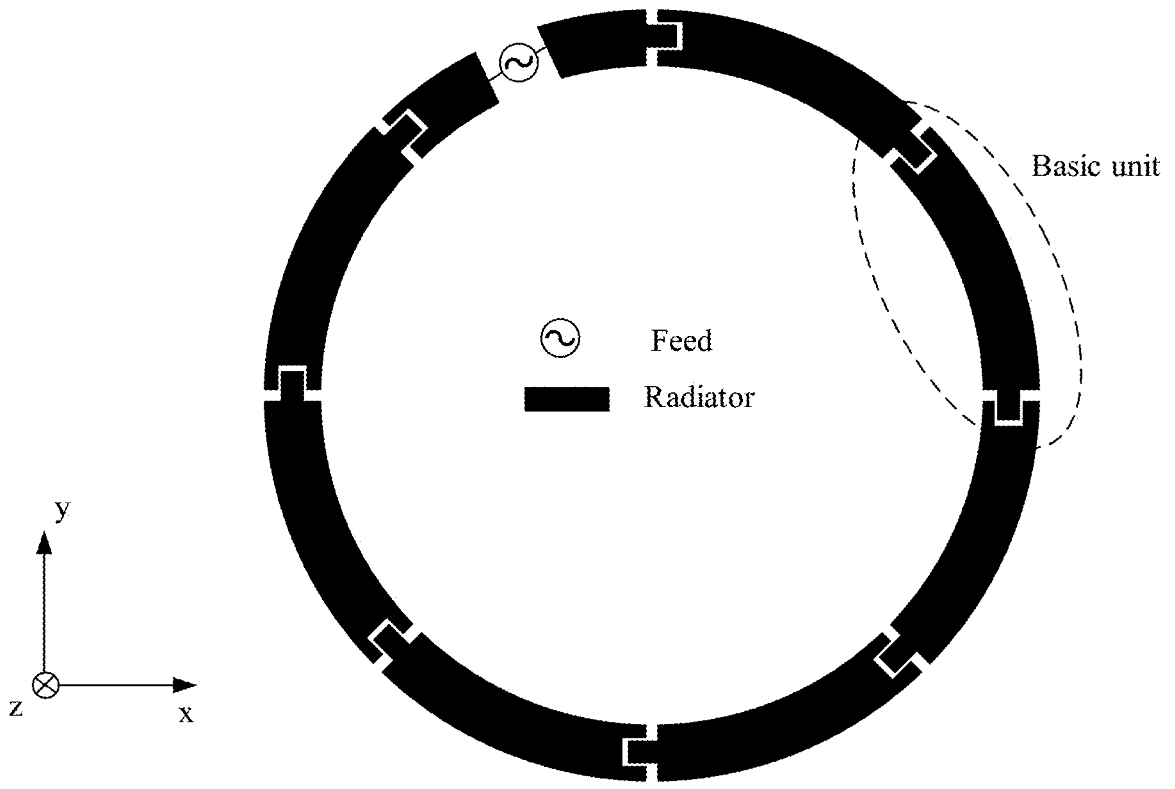
FIG. 27 is a schematic diagram of composition of a horizontally polarized antenna according to an embodiment of this application.

For example, FIG. 27 is a schematic diagram of an MNG antenna solution. The MNG antenna may have a horizontal polarization characteristic. As shown in FIG. 27, the MNG antenna may be disposed in the xoy plane. The MNG antenna may include a plurality of basic units, and structures of the basic units are the same or similar. A coupling slot is disposed between the basic units. That is, the basic units are not directly connected, but are electrically coupled by using the coupling slot. In the example shown in FIG. 27, the MNG antenna may include eight basic units. In some other implementations, a quantity of basic units included in the MNG antenna may be any other integer greater than or equal to 2.

In this example, two ends of each of the plurality of basic units may be separately coupled and connected by using the coupling slot. For example, any basic unit may be separately adjacent to two other basic units, and separately coupled and connected by using two coupling slots. In this way, the MNG antenna includes M basic units. Two ends of a basic unit 1 may be respectively coupled to one end of a basic unit M and one end of a basic unit 2, and two ends of the basic unit 2 may be respectively coupled to one end of the basic unit 1 and one end of a basic unit 3. By analogy, two ends of a basic unit M−1 may be respectively coupled to one end of a basic unit M−2 and one end of the basic unit M. Two ends of the basic unit M may be respectively coupled to one end of the basic unit M−1 and one end of the basic unit 1. In this example, two adjacent basic units are coupled and connected by using a coupling slot. In some other implementations of this application, two adjacent basic units may be further implemented by using a series capacitor. That is, two adjacent basic units may be coupled by using a distributed capacitor, or may be connected by using a lumped capacitor (for example, a capacitor device).

It should be noted that, in this application, the radiator of the MNG antenna may also be described as a third radiator disposed in a ring shape.

In this way, the plurality of basic units are separately connected by using the coupling slot, so as to form a serial connection to the ENG antenna in the foregoing example. In this way, a ring including a plurality of penetration coupling slots may be formed.

When structures of basic units forming the MNG antenna are the same, the corresponding MNG antenna may have a rotationally symmetric structural feature. A rotational symmetry center of the rotational symmetry is a center of the MNG antenna. A rotation angle of the rotational symmetry may be determined according to a quantity M of basic units constituting the MNG antenna. For example, the rotation angle may be 360°/M.

A feed may be further disposed in the MNG antenna. In the example in FIG. 27, the feed may be disposed at a middle position of any basic unit. For example, the feed may split a radiator of any basic unit into two parts at the middle position, and the feed may be connected in series between the two parts of the radiator obtained through splitting. Therefore, power feeding to the MNG antenna is implemented.

Based on the example of the antenna shown in FIG. 27, an operating frequency band of the MNG antenna may be determined according to an electrical length of a basic unit and a coupling capacitance between adjacent basic units. It should be understood that the electrical length of the basic unit may be equivalent to an inductor LR (M), and a coupling capacitance between adjacent basic units may be equivalent to a capacitor CL (M).

In some embodiments, when the operating frequency band of the MNG antenna includes 5G Wi-Fi (for example, 5150 MHz-5850 MHz), a value of the LR (M) may be included in a range of [1 nH, 4 nH], and a value of the CR (M) may be included in a range of [0.1 pF, 1 pF].

In some other embodiments, when the operating frequency band of the MNG antenna includes a medium or high frequency (for example, 1710 MHz-2700 MHz), the value of the LR (M) may be included in a range of [3 nH, 10 nH], and the value of the CR (M) may be included in a range of [0.1 pF, 2 pF].

It should be understood that, as a current loop antenna, when the MNG antenna shown in FIG. 27 works, a current that can be uniformly distributed in a metal structure of a circular loop can be formed, and belongs to a horizontal current loop antenna. The structure is a magnetic dipole, a magnetic field of the structure is in a vertical direction, a corresponding electric field is in a horizontal direction, a reference ground is also in the horizontal direction, and the electric field direction is parallel to the reference ground. Therefore, the MNG antenna has a horizontal polarization characteristic.

With reference to the foregoing description of the ENG antenna, it may be learned that the MNG antenna and the ENG antenna have a transmission structure dual feature. Spatial field distribution of the two antenna solutions is complementary. Therefore, by using a combination of the MNG antenna and the ENG antenna, rich polarization characteristics can be obtained, so as to compensate for a deficiency of each antenna in terms of a directivity pattern and a polarization direction, and obtain better radiation coverage.

Figure 28:
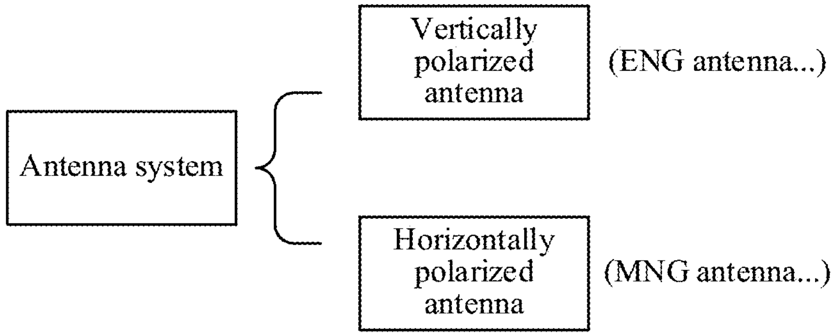
FIG. 28 is a schematic diagram of logical composition of a MIMO antenna system according to an embodiment of this application.

For example, FIG. 28 is a schematic diagram of logical composition of a MIMO antenna system according to an embodiment of this application. The MIMO antenna system provided in this embodiment of this application may include at least one vertically polarized antenna and at least one horizontally polarized antenna. To enable the MIMO antenna system to have a structural feature of a low profile, in this example, the at least one vertically polarized antenna and the at least one horizontally polarized antenna included in the MIMO antenna system also have a structural feature of a low profile. For example, components of the at least one vertically polarized antenna and the at least one horizontally polarized antenna may be disposed in a same plane, or components of the at least one vertically polarized antenna and the at least one horizontally polarized antenna may be disposed in a space whose height (for example, a z-direction height) does not exceed a preset height threshold. As an example, the MIMO antenna system includes a low-profile horizontally polarized antenna and a low-profile vertically polarized antenna. The low-profile horizontally polarized antenna may be an MNG antenna. In some embodiments, the MNG antenna may have composition shown in FIG. 27. The low-profile vertically polarized antenna may be an ENG antenna. In some embodiments, the ENG antenna may have composition of the antenna in any one of FIG. 6 to FIG. 19.

Figure 29:
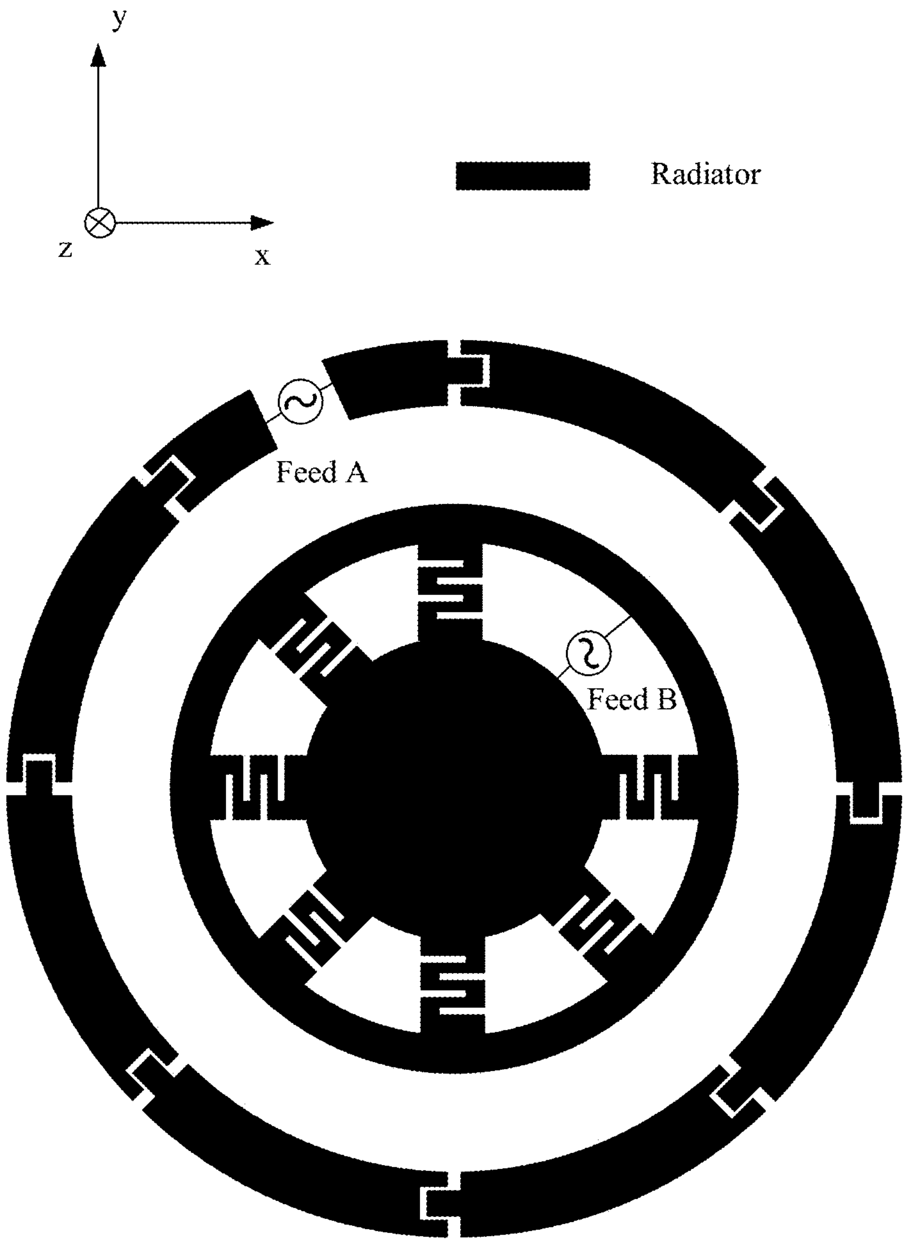
FIG. 29 is a schematic diagram of composition of a MIMO antenna system according to an embodiment of this application.

For example, FIG. 29 is a schematic diagram of composition of a MIMO antenna system according to an embodiment of this application. For example, N=M=8, that is, the MNG antenna includes eight basic units, and the ENG antenna includes eight basic radiating elements.

As shown in FIG. 29, in the MIMO antenna system, the MNG antenna may be disposed outside the ENG antenna. For example, a radiator of the ENG antenna may be disposed inside a circular ring corresponding to the MNG antenna. In some embodiments, geometric centers of the MNG antenna and the ENG antenna coincide.

A feed B may be disposed on the ENG antenna, and the feed B may replace a position of any ground inductor in composition of the ENG antenna. With reference to the foregoing description of disposing the feed of the ENG antenna, in some other embodiments, the feed B may be further disposed at a middle position of any basic radiating element that constitutes the ENG antenna. In the example shown in FIG. 29, a feed A may be disposed on the MNG antenna, and the feed A may be disposed at a middle position of any basic unit of the MNG antenna. Disposing of the feed A and the feed B is merely an example in the schematic diagram in FIG. 29. A relative disposing position relationship between the feed A and the feed B is not limited in this embodiment of this application.

As shown in FIG. 29, spatial positions of a radiator, a feed, and the like of the MNG antenna and the ENG antenna have no requirements on the z-direction height. Therefore, both the MNG antenna and the ENG antenna may be disposed in the xoy plane. That is, the MIMO antenna system formed by the MNG antenna and the ENG antenna may have a structural characteristic of a low profile.

Figure 30:
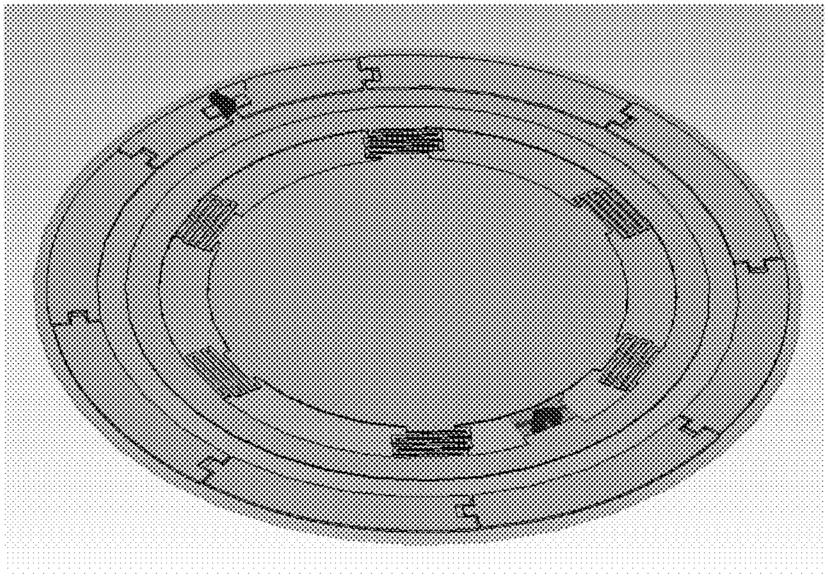
FIG. 30 is a schematic diagram of different angles of a MIMO antenna system in an actual implementation process according to an embodiment of this application.
Figure 30:
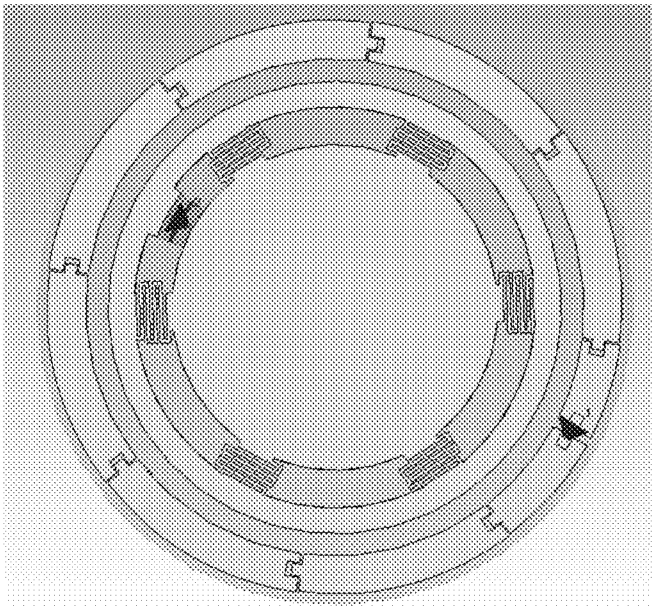

In some embodiments, the MIMO antenna system may be implemented in an FPC form. The MNG antenna and the ENG antenna may be disposed in a same plane by using a cable covered by metal such as copper or silver. For example, FIG. 30 shows a 45° view and a top view of the MIMO antenna system in a specific implementation process.

Certainly, in some other embodiments, the MIMO antenna system may further implement disposing of each antenna in any manner in the foregoing description, for example, an LDS.

The MIMO antenna system provided in this embodiment of this application can provide omni-directional radiation coverage including a vertical polarization characteristic and a horizontal polarization characteristic with reference to respective radiation features of the MNG antenna and the ENG antenna. In addition, better efficiency can be achieved in all frequency bands.

The following describes a working status of the MIMO antenna system provided in the embodiments of this application with reference to a simulation result. For example, the MIMO antenna system has the composition shown in FIG. 29. For a working status of the MNG antenna in the MIMO antenna system shown in FIG. 29, refer to description in FIG. 20-FIG. 25.

It should be noted that, in the composition of the MIMO antenna system shown in FIG. 29, for a size requirement of each component, refer to descriptions of the ENG antenna and the MNG antenna in the foregoing description. Details are not described herein again. For example, in the following simulation, for the ENG antenna, with reference to FIG. 19, a radius of the radiator 132 (that is, a radius of a solid circle disposed inside the ENG antenna) may be set to 9.5 mm, a slot distance between the radiator 131 and the radiator 132 may be set to 2.2 mm, and a width of the radiator 131 may be set to 1.5 mm. For the MNG antenna, a width of the basic unit may be set to 2.2 mm, and an inner circle radius of a circular ring corresponding to the MNG antenna may be set to 14.7 mm. A width of a hollow ring between the MNG antenna and the ENG antenna (that is, a minimum distance from the outermost side of the ENG antenna to the inner side of the MNG) may be set to 1.5 mm.

Figure 31:
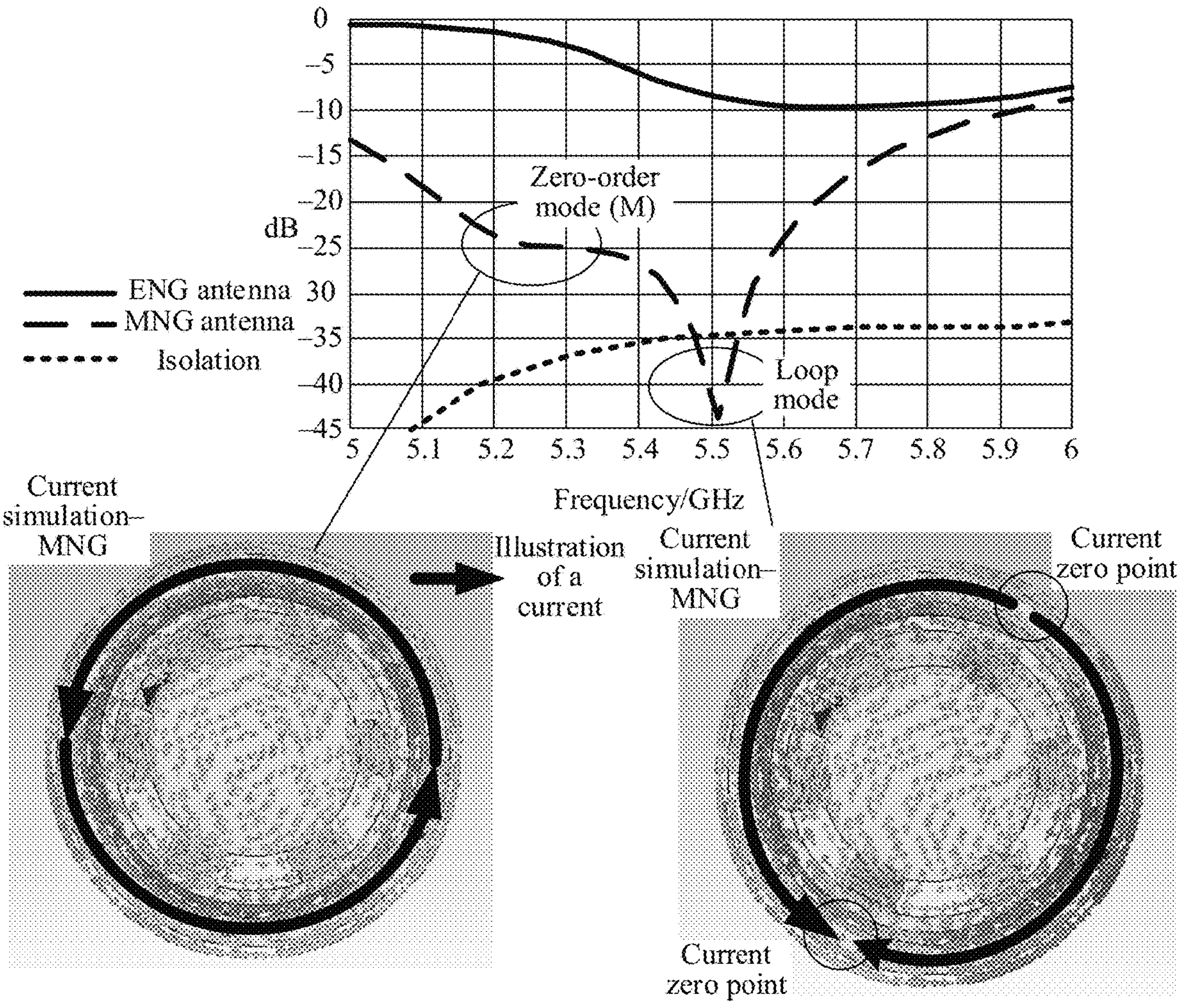
FIG. 31 is a schematic diagram of S parameter simulation and current simulation of a MIMO antenna system according to an embodiment of this application.

FIG. 31 is a schematic diagram of simulation of the MIMO antenna system having the composition shown in FIG. 29. As shown in FIG. 31, in this example, the ENG antenna and the MNG antenna may be configured to jointly cover an operating frequency band (such as a 5G Wi-Fi frequency band). A radiation status of the ENG antenna is described in detail in the foregoing description, and details are not described herein again. For the MNG antenna, at least two resonances may be generated. With reference to current simulation in FIG. 31, a low-frequency resonance generated by the MNG antenna may be corresponding to a current of a uniform size that is not reversed on the radiator, and meets a radiation feature of the current loop antenna, and may also be referred to as a zero-order mode corresponding to the MNG antenna, for example, a zero-order mode (M). Current distribution corresponding to the zero-order mode is shown in the left figure in FIG. 31. A high-frequency resonance generated by the MNG antenna may be corresponding to current distribution that has two current reverse points (that is, current zero points) on the radiator, and may be corresponding to a ½ wavelength mode in a loop mode (that is, a Loop mode). Current distribution corresponding to the loop mode is shown in the right figure in FIG. 31. In this way, the MNG antenna may excite and obtain two resonances at the same time, thereby providing better bandwidth coverage for the MIMO antenna system.

Isolation simulation situations of both antennas are also provided in FIG. 31. It should be understood that in a multi-MIMO antenna system, in particular, when operating frequency bands of two or more antennas are close or overlap, mutual interference between the antennas is likely to occur. Corresponding to an S parameter, the larger the absolute value of dual-port isolation is, the smaller mutual interference is. Conversely, the smaller the absolute value of isolation is, the larger mutual interference is. With reference to the example in FIG. 31, in the MIMO antenna system provided in this embodiment of this application, dual-port isolation between the MNG antenna and the ENG antenna is below −30 dB on the entire 5G Wi-Fi frequency band. That is, if the absolute value of isolation between the MNG antenna and the ENG antenna is relatively large, it indicates that mutual impact between the two antennas is within a controllable range.

Figure 32:
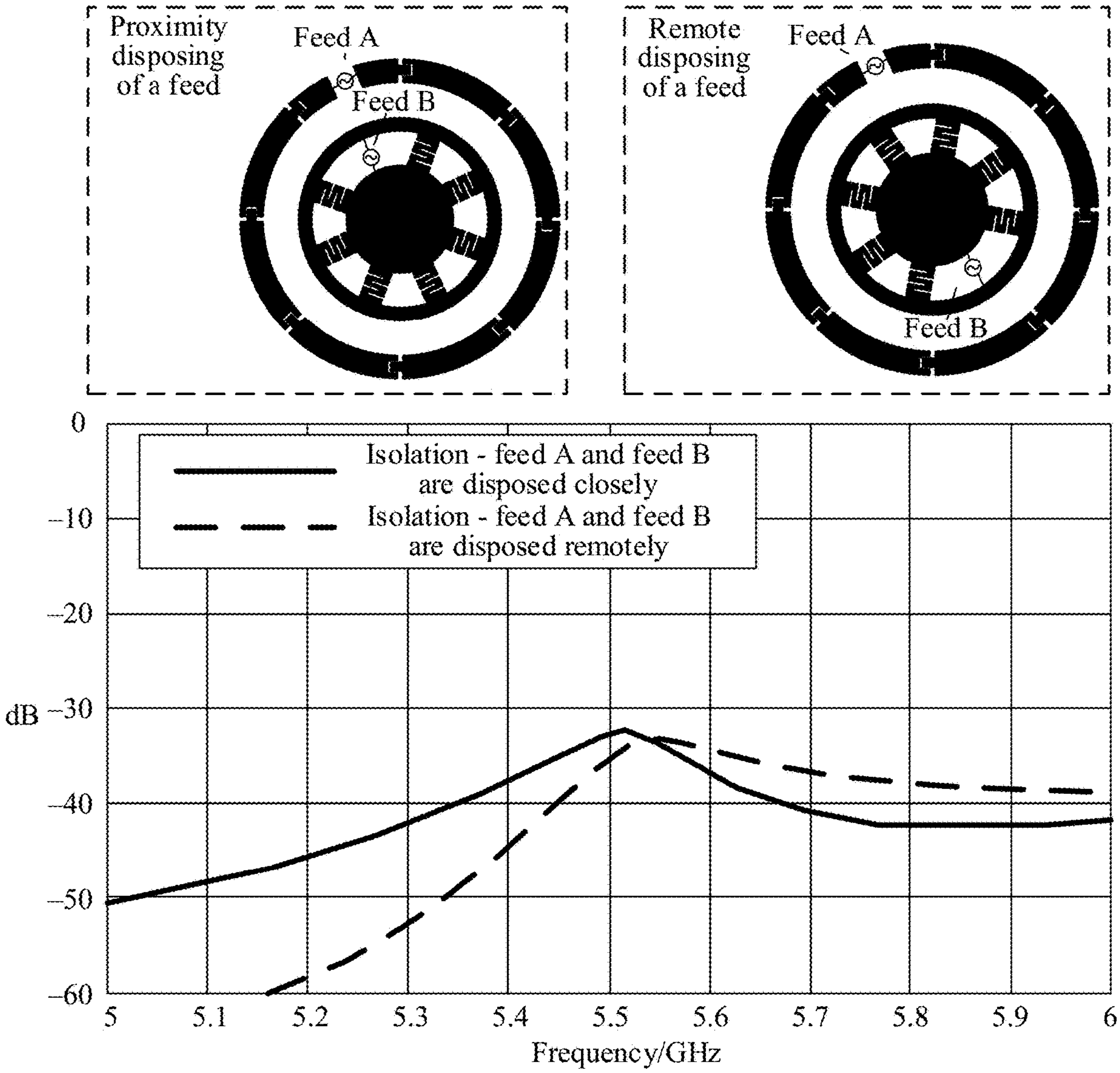
FIG. 32 is a schematic diagram of S11 comparison when a feed is disposed at different positions in a MIMO antenna system according to an embodiment of this application.

As described above for FIG. 29, in this embodiment of this application, positions of feeds of the two antennas are not strictly limited. In this application, radiation of the MNG antenna and radiation of the ENG antenna are relatively independent, and therefore, feed disposing at different positions does not significantly deteriorate isolation. For example, FIG. 32 is a schematic diagram of isolation in a relative position relationship between two feeds. The relative position relationship of the feeds includes proximity disposing and remote disposing. The proximity disposing may be understood as that disposing angles of the two feeds relative to a same reference line are the same. For example, the reference line is a vertical line that passes through the geometric center of the antenna. When an angle between the reference line and a connection line between a feed A of the MNG antenna and the geometric center is ALPHA, an angle between the reference line and a connection line between a feed B of the ENG antenna that is disposed close and the geometric center is also ALPHA. Correspondingly, in a case of remote disposing, when the angle between the reference line and the connection line between the feed A of the MNG antenna and the geometric center is ALPHA, the angle between the reference line and the connection line between the feed B of the ENG antenna that is disposed close and the geometric center is ALPHA+180°.

As shown in FIG. 32, in both cases, the antenna isolation does not change significantly, and is below −30 dB on the entire operating frequency band. Therefore, in different implementation environments, feed positions of two antennas in the MIMO antenna system may be flexibly configured according to a specific situation.

Figure 33:
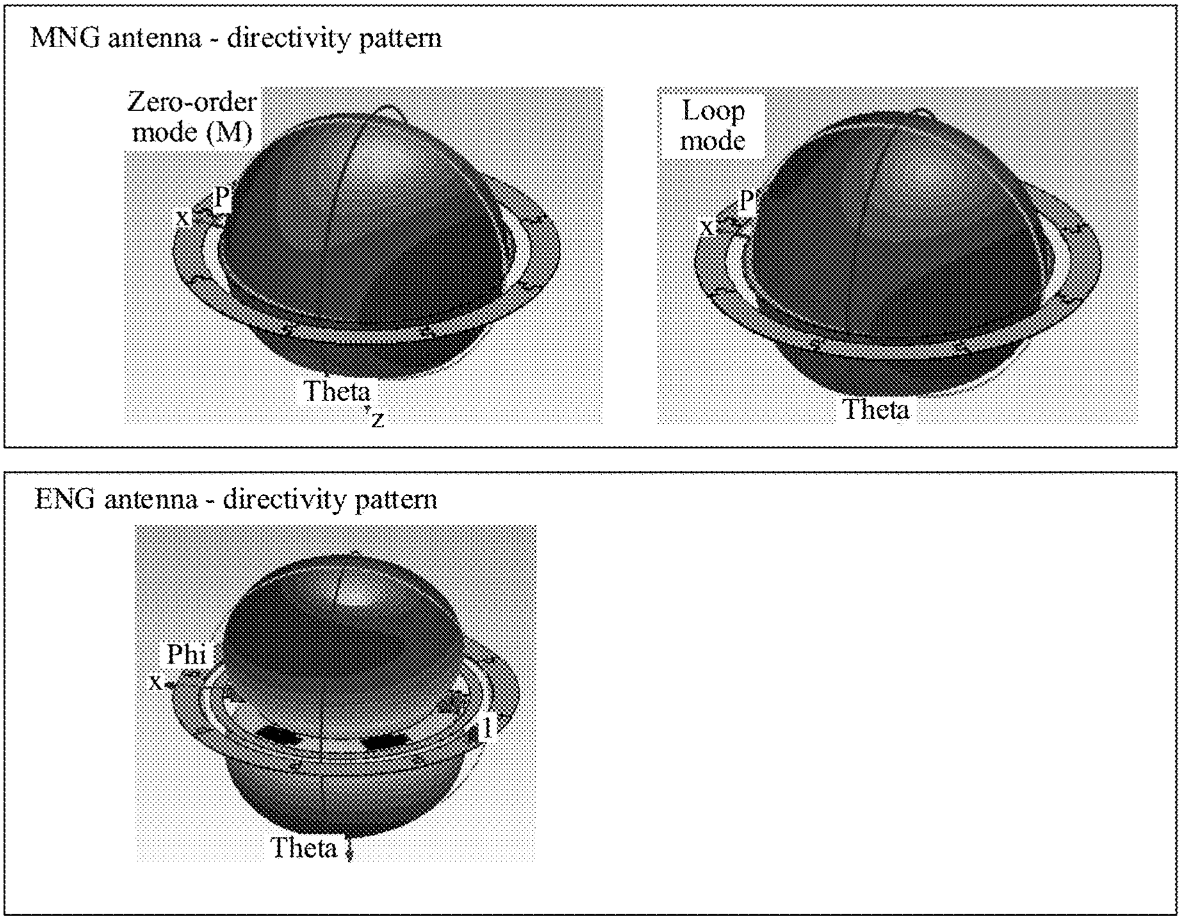
FIG. 33 is a schematic diagram of directivity pattern simulation in a MIMO antenna system according to an embodiment of this application.

With reference to the foregoing description of the MNG antenna and the ENG antenna, through directivity pattern distribution, it may be proved that the MNG antenna may have a horizontal polarization characteristic, and the ENG antenna has a vertical polarization characteristic. In this example, after two antennas are formed into one MIMO antenna system, corresponding polarization characteristics do not change significantly, so that the entire MIMO antenna system can provide both the horizontal polarization characteristic and the vertical polarization characteristic. For example, referring to FIG. 33, both the MNG antenna and the ENG antenna have omnidirectivity. In addition, directivity patterns of two modes of the MNG antenna, for example, a zero-order mode (M) and a Loop mode, have relatively strong gains on an equatorial plane, and represent as horizontal polarization. A directivity pattern of an opposite ENG antenna has a relatively small gain on the equatorial plane, and correspondingly has relatively strong gain distribution at 60° angle, so as to represent vertical polarization. It may be learned that, even if two antennas are disposed in a same MIMO antenna system, because structure distribution and working principles are different from each other, for example, the MNG antenna radiates based on a magnetic field, and the ENG antenna radiates based on an electric field. Their respective polarization characteristics are not significantly changed, so that the MIMO antenna system provided in this embodiment of this application can provide both the horizontal polarization characteristic and the vertical polarization characteristic.

Although this application is described with reference to specific features and the embodiments thereof, obviously, various modifications and combinations may be made to them without departing from the spirit and scope of this application. Correspondingly, this specification and the accompanying drawings are merely example description of this application defined by the appended claims, and are considered as any of or all modifications, variations, combinations or equivalents that cover the scope of this application. Obviously, a person skilled in the art can make various modifications and variations to this application without departing from the spirit and scope of this application. In this way, this application is intended to cover these modifications and variations of this application provided that they fall within the scope of the claims of this application and their equivalent technologies.

What is claimed is:

1. A terminal antenna, comprising:

a first radiator having a ring structure;

a second radiator, disposed inside a space defined by the ring structure of the first radiator, wherein the first radiator and the second radiator are not directly connected, and the first radiator and the second radiator are located on a same plane; and at least two inductor components, wherein a first end of a first inductor component of the at least two inductor components is connected to the first radiator, and a second end of the first inductor component is connected to the second radiator; and wherein a feed is disposed on the terminal antenna, a first end of the feed is connected to the first radiator, and a second end of the feed is connected to the second radiator.

2. The terminal antenna according to claim 1, wherein the first inductor component is a metal body distributed in a serpentine line.

3. The terminal antenna according to claim 1, wherein the at least two inductor components are rotationally symmetrically distributed in a slot between the first radiator and the second radiator.

4. The terminal antenna according to claim 3, wherein a symmetry angle of the rotational symmetry is 360 degrees divided by N, and N is a quantity of inductor components of the at least two inductor components.

5. The terminal antenna according to claim 3, wherein the feed is disposed at a middle position between any two adjacent inductor components of the at least two inductor components.

6. The terminal antenna according to claim 3, wherein the feed is disposed between the first radiator and the second radiator.

7. The terminal antenna according to claim 1, wherein:

the first radiator has a circular ring structure;

the second radiator has a circular structure; and geometric centers of the first radiator and the second radiator coincide.

8. The terminal antenna according to claim 7, wherein when an operating frequency band of the terminal antenna comprises 5150 MHz to 5850 MHz, an equivalent inductance of the first radiator between two adjacent inductor components is comprised in a range of 1 nH to 4 nH, an equivalent capacitance between the first radiator and the second radiator between two adjacent inductor components is comprised in a range of 0.1 pF to 1 pF, and an equivalent inductance of the inductor component is comprised in a range of 1 nH to 5 nH; and a region between the two adjacent inductor components does not comprise the feed.

9. The terminal antenna according to claim 1, wherein when an operating frequency band of the terminal antenna comprises 5150 MHz to 5850 MHz, an inner circle radius of the first radiator is comprised in a range of 10 mm to 25 mm, a radius of the second radiator is comprised in a range of 8 mm to 15 mm, and a maximum width of a contour of the inductor component distributed in a serpentine line is comprised in a range of 1 mm to 6 mm; and the inner circle radius of the first radiator is greater than the radius of the second radiator.

10. The terminal antenna according to claim 1, wherein when an operating frequency band of the terminal antenna comprises 1710 MHz to 2700 MHz, an equivalent inductance of the first radiator between two adjacent inductor components is comprised in a range of 3 nH to 10 nH, and an equivalent capacitance between the first radiator and the second radiator between two adjacent inductor components is comprised in a range of 0.3 pF to 2 pF, an equivalent inductance of the inductor component is comprised in a range of 3 nH to 15 nH, and the feed is not comprised between the two adjacent inductor components.

11. The terminal antenna according to claim 1, wherein the terminal antenna has a vertical polarization characteristic when operating.

12. An electronic device, comprising a terminal antenna, the terminal antenna comprising:

a first radiator having a ring structure;

a second radiator is disposed inside a space defined by the ring structure of the first radiator, wherein the first radiator and the second radiator are not directly connected, and the first radiator and the second radiator are located on a same plane;

at least two inductor components, wherein a first end of a first inductor component of the at least two inductor components is connected to the first radiator, and a second end of the first inductor component is connected to the second radiator;

wherein the electronic device further comprises a feed, a first end of the feed is connected to the first radiator, and a second end of the feed is connected to the second radiator; and when transmitting or receiving a signal, the electronic device transmits or receives the signal by using the terminal antenna.

13. The electronic device according to claim 12, wherein the electronic device comprises a large screen or a router.

14. The electronic device according to claim 12, wherein the feed is disposed between the first radiator and the second radiator.

15. The electronic device according to claim 12, wherein:

the first radiator has a circular ring structure;

the second radiator has a circular structure; and geometric centers of the first radiator and the second radiator coincide.

16. A terminal antenna, comprising:

a first radiator having a ring structure;

a second radiator, disposed inside a space defined by the ring structure of the first radiator, wherein the first radiator and the second radiator are not directly connected, and the first radiator and the second radiator are located on a same plane; and a first inductor component, wherein a first end of the first inductor component is connected to the first radiator, and a second end of the first inductor component is connected to the second radiator; and wherein a feed is disposed on the terminal antenna, a first end of the feed is connected to the first radiator, and a second end of the feed is connected to the second radiator.

17. The terminal antenna according to claim 16, wherein the first inductor component and the feed are rotationally symmetrically distributed in a slot between the first radiator and the second radiator.

18. The terminal antenna according to claim 16, wherein:

the first radiator has a circular ring structure;

the second radiator has a circular structure; and geometric centers of the first radiator and the second radiator coincide.

19. The terminal antenna according to claim 16, wherein the terminal antenna has a vertical polarization characteristic when operating.

20. The terminal antenna according to claim 16, wherein the feed is disposed between the first radiator and the second radiator.

* * * * *